United States Patent [19]

Baer et al.

[11] Patent Number: 5,168,187
[45] Date of Patent: Dec. 1, 1992

[54] AXIAL POLE STEPPING MOTOR

[75] Inventors: John S. Baer, Bar Harbor, Me.; William R. Coon, El Paso, Tex.; John Frus, Jacksonville, Fla.

[73] Assignee: Dana Corporation, Warner Electric Brake & Clutch Division, So. Beloit, Ill.

[21] Appl. No.: 658,205

[22] Filed: Feb. 20, 1991

[51] Int. Cl.[5] ............... H02K 37/12; H02K 1/22; H02K 3/04; H02K 3/28
[52] U.S. Cl. ................ 310/49 R; 310/268; 310/185
[58] Field of Search ........... 310/49 R, 179, 180, 310/185, 268, 156

[56] References Cited

U.S. PATENT DOCUMENTS

| | | | |
|---|---|---|---|
| 680,597 | 8/1901 | Joel | 310/180 |
| 1,554,438 | 9/1925 | Lee | 310/180 |
| 1,578,916 | 3/1926 | Perkins | 310/180 |
| 1,630,757 | 5/1927 | Perkins | 310/180 |
| 3,090,880 | 5/1963 | Raymond | 310/268 |
| 3,392,293 | 7/1968 | De Boo et al. | 310/49 R |
| 3,539,847 | 11/1970 | Gifford | 310/49 R |
| 3,899,701 | 8/1975 | Ogawa et al. | 310/40 MM |
| 4,079,279 | 3/1978 | Oudet et al. | 310/164 |
| 4,155,018 | 5/1979 | Oudet | 310/49 R |
| 4,207,483 | 6/1980 | Baer | 310/49 R |
| 4,242,623 | 12/1980 | Oudet et al. | 318/696 |
| 4,387,312 | 6/1983 | Oudet | 310/49 R |
| 4,394,594 | 7/1983 | Schmider et al. | 310/268 |
| 4,424,463 | 1/1984 | Musil | 310/49 R |
| 4,517,478 | 5/1985 | Oudet | 310/49 R |
| 4,518,883 | 5/1985 | Oudet | 310/49 R |
| 4,629,916 | 12/1986 | Oudet | 310/49 R |
| 4,658,166 | 4/1987 | Oudet | 310/156 |
| 4,682,067 | 7/1987 | Oudet | 310/156 |
| 4,707,677 | 11/1987 | Oudet | 335/284 |
| 4,714,854 | 12/1987 | Oudet | 310/268 |
| 4,737,753 | 4/1988 | Oudet | 335/284 |
| 4,965,864 | 10/1990 | Roth et al. | 310/12 |

FOREIGN PATENT DOCUMENTS

| | | | |
|---|---|---|---|
| 93377 | 10/1972 | German Democratic Rep. | |
| 0200756 | 10/1985 | Japan | 310/49 R |
| 0888685 | 1/1962 | United Kingdom | 310/268 |
| 2034532 | 6/1980 | United Kingdom | 310/49 R |

Primary Examiner—Steven L. Stephan
Assistant Examiner—C. LaBalle
Attorney, Agent, or Firm—Leydig, Voit & Mayer

[57] ABSTRACT

An axial pole stepping motor having a stator assembly on one or both sides of a disc-shaped rotor and including a plurality of teeth extending parallel to the rotational axis of the motor's drive shaft with the teeth arranged into at least two groups and evenly spaced within each of the two groups such that the teeth of each group may be axially aligned with the north-south poles of the permanent magnets evenly spaced about the circumference of the rotor. The two groups of teeth are circumferentially offset from each other such that the teeth of both groups cannot be simultaneously aligned with the north-south poles of the rotor. The circumferential offsetting of the two groups defines a stepping angle for the rotation of the motor shaft. A continuous skein winding woven in a labyrinth pattern between and among the teeth of each group transforms the teeth into salient poles. The windings may be energized in several modes. In order to provide stability in all modes of energization, at least one extra tooth not associated with the windings can be provided in the circumferential intergroup gap separating adjacent groups of teeth in the single stator assembly.

24 Claims, 18 Drawing Sheets

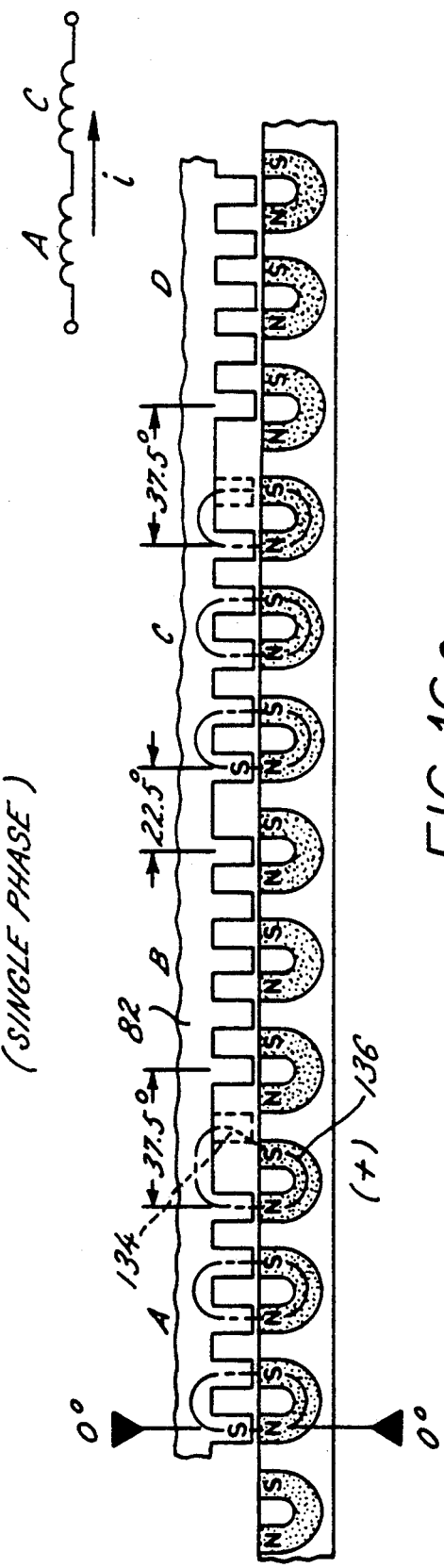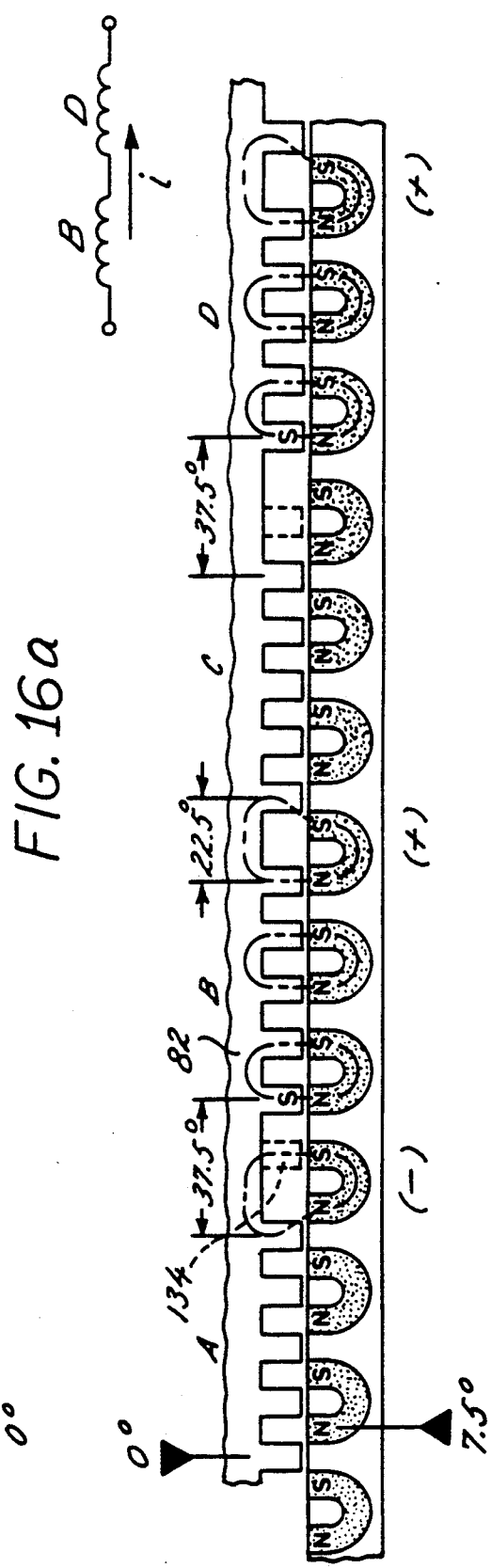

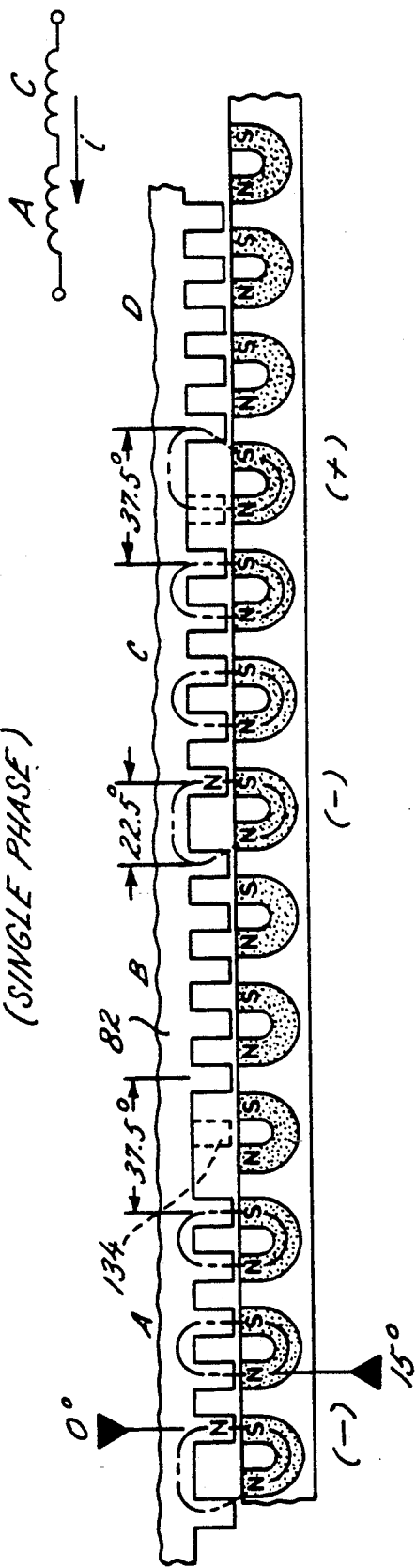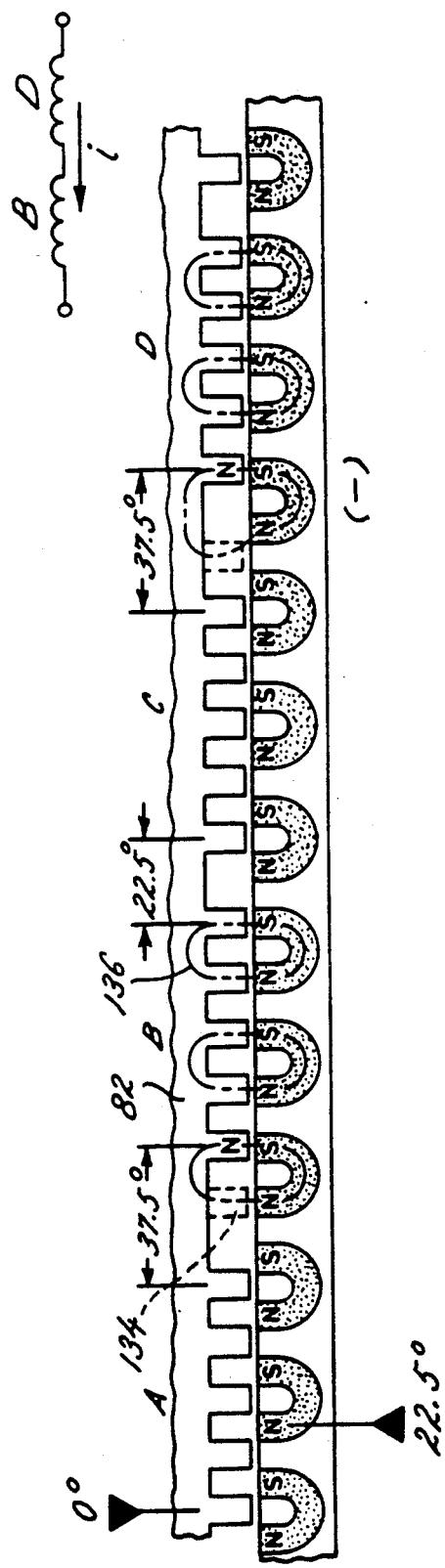
FIG. 16c
FIG. 16d

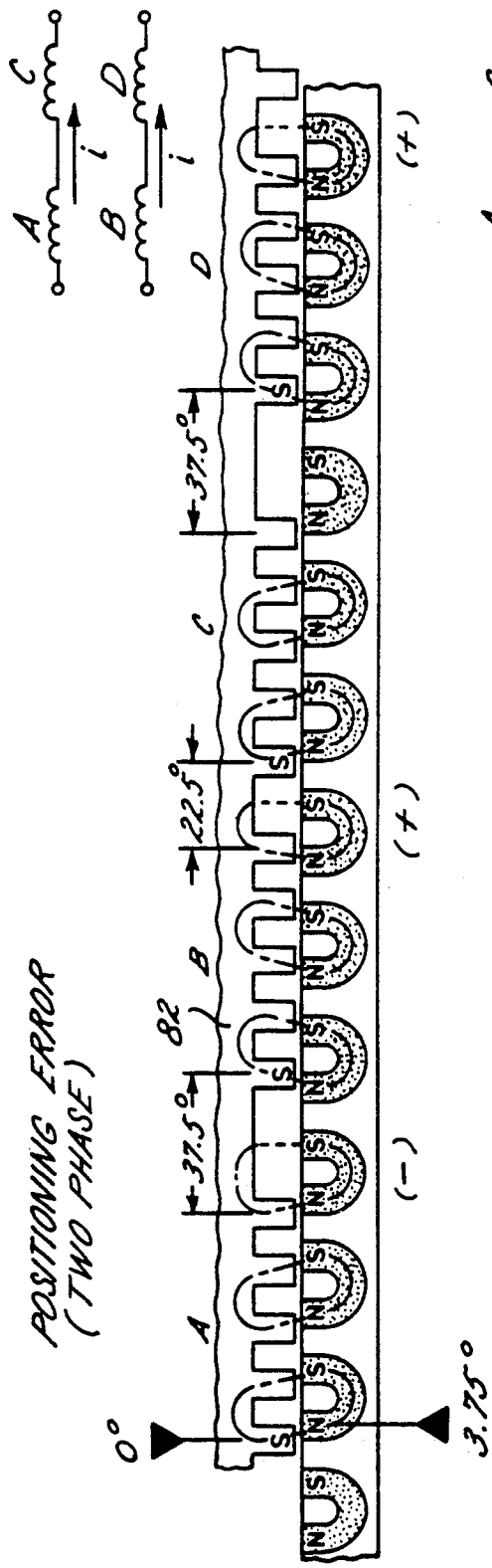 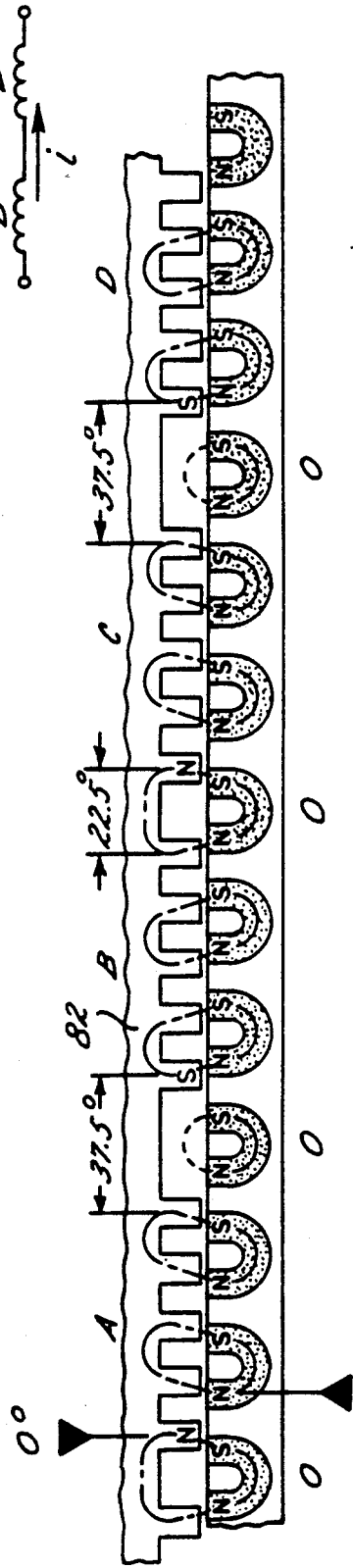
FIG. 17a
FIG. 17b

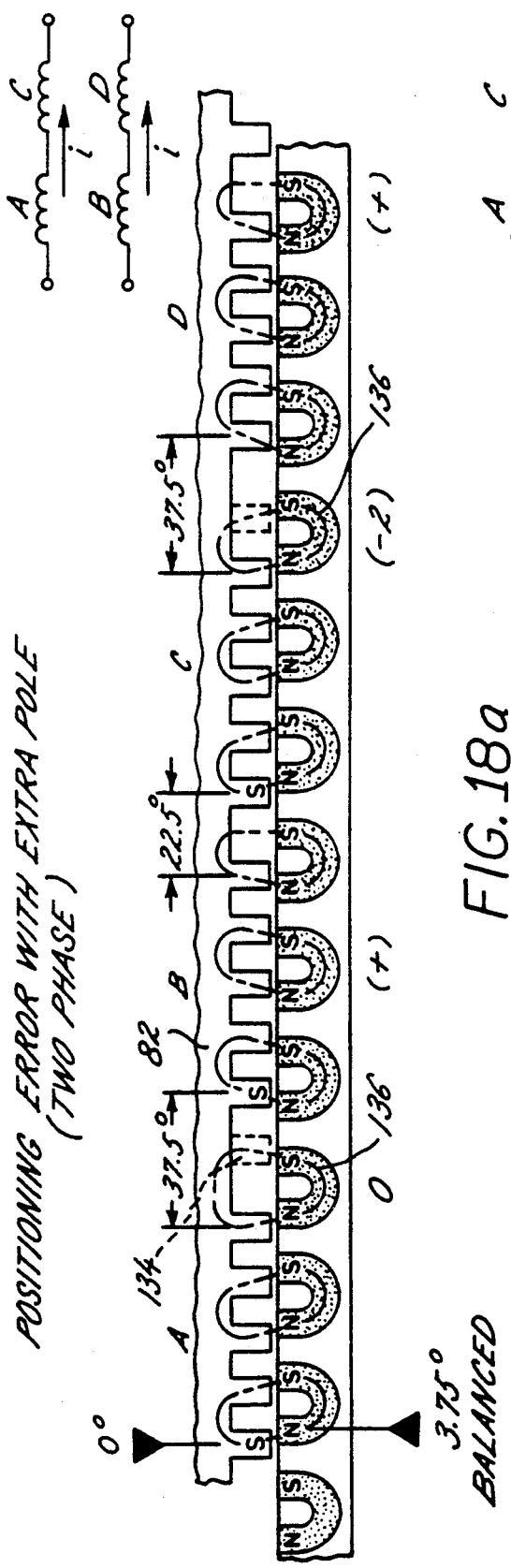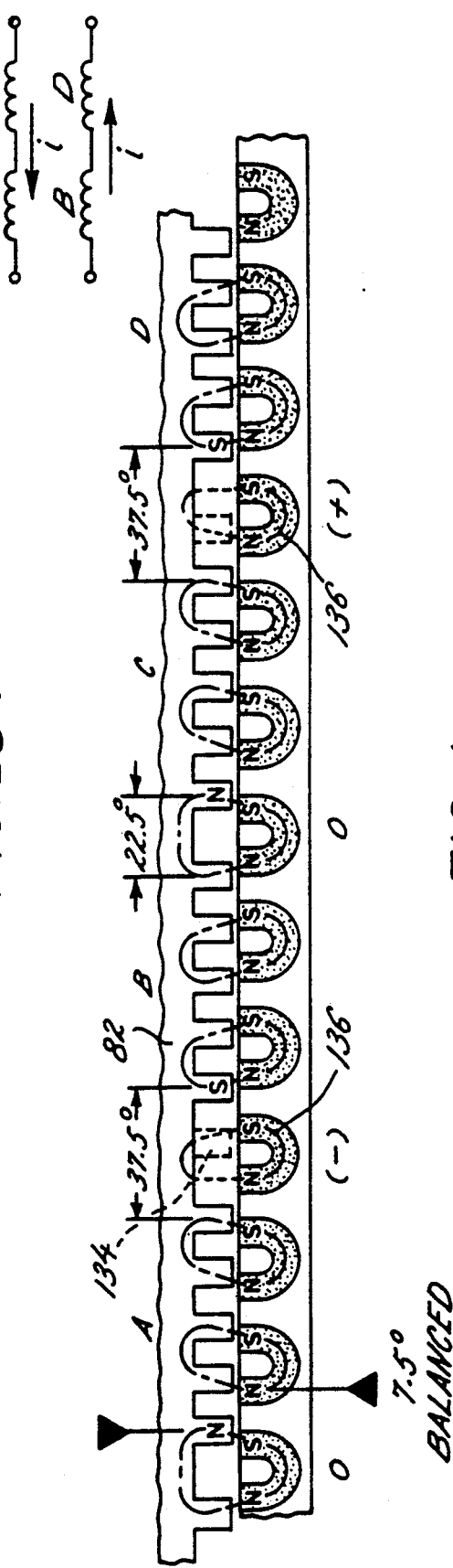
FIG. 18a
FIG. 18b

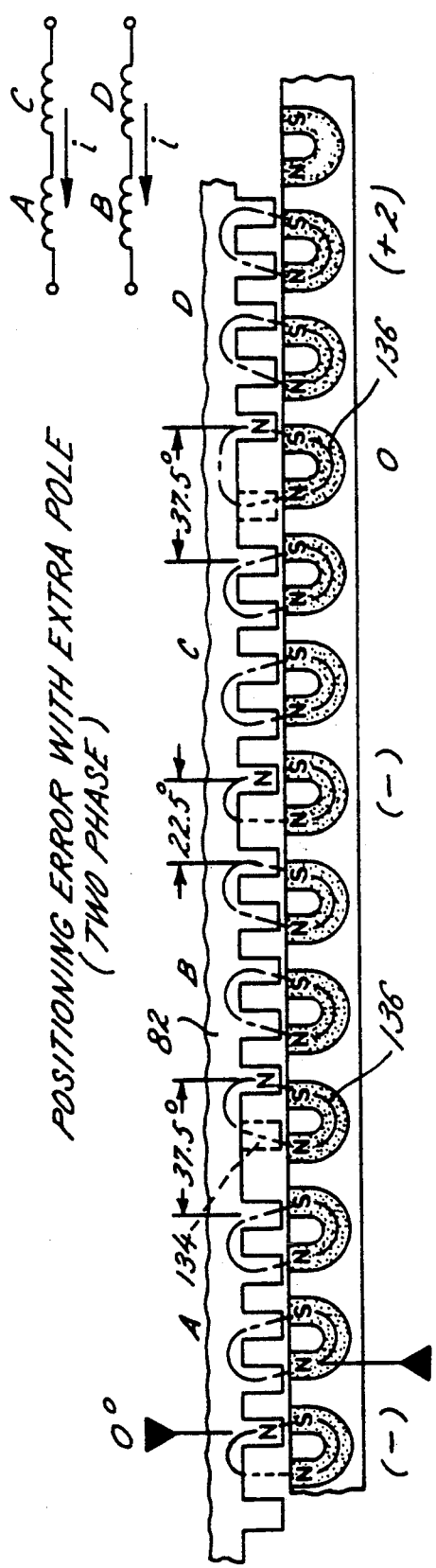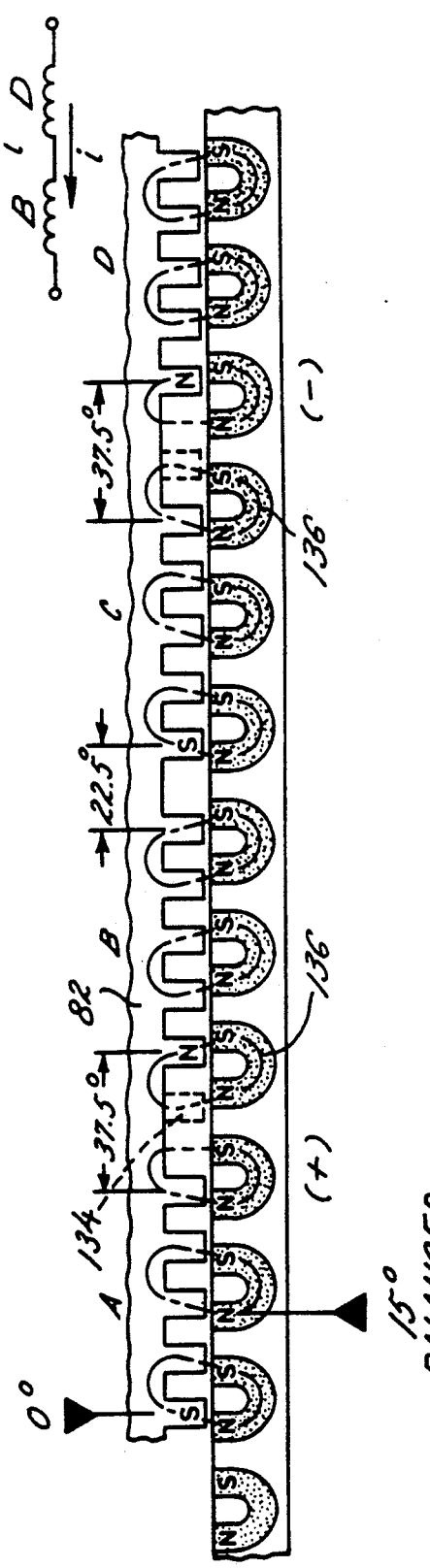

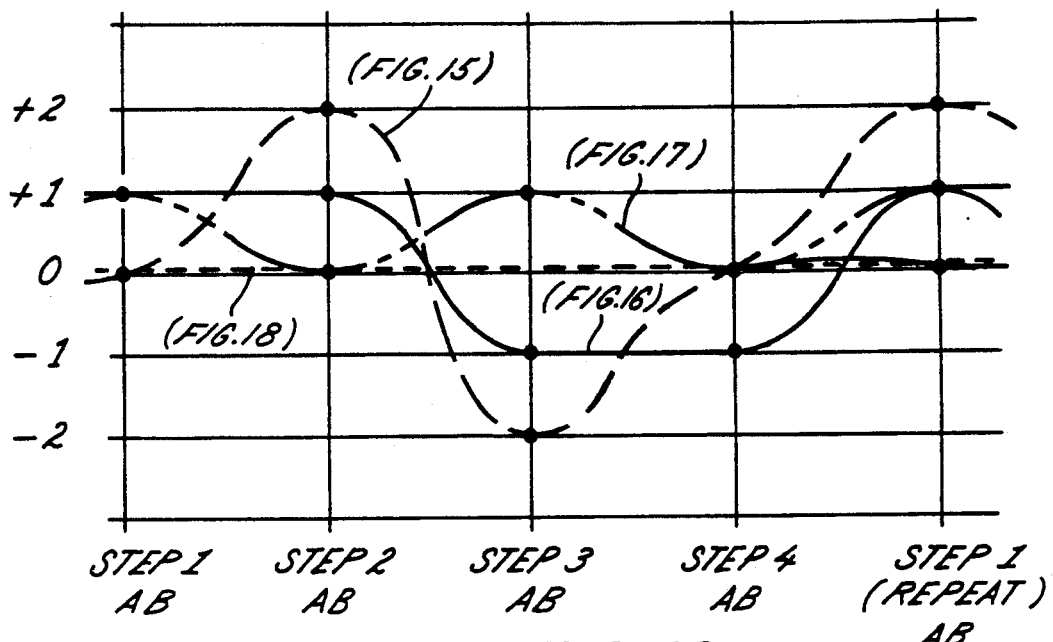
FIG. 19
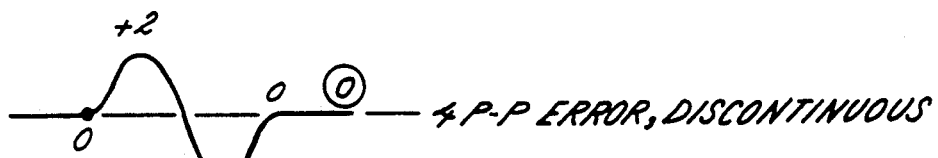
FIG. 20a (1θ WITHOUT POLES)
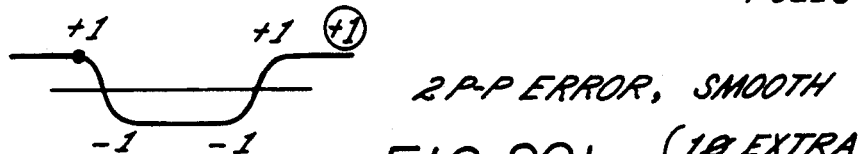
FIG. 20b (1θ EXTRA POLES)
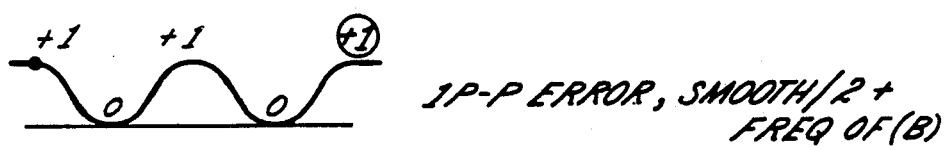
FIG. 20c (2θ WITHOUT POLES)
FIG. 20d (2θ EXTRA POLES)

AXIAL POLE STEPPING MOTOR

FIELD OF THE INVENTION

This invention relates to stepping motors and more particularly to stepping motors that utilize permanent magnet rotors and which occupy the lower end of the price spectrum for stepping motors as a class.

BACKGROUND OF THE INVENTION

Stepping motors are available to cover a wide variety of applications and may range from quite expensive to inexpensive depending, in large measure, on the degree of structural complexity required of the motor to satisfy the needs of the particular application. The present invention deals with inexpensive motors which must approximate the accuracy of higher-priced stepping motors (e.g. accurate and repeatable step angles), but must be designed with economy and simplicity in mind so that they can be sold at relatively low cost. In the prior art, these type of motors are sometimes referred to as "tin-can" motors, because the motor housing is of a simple construction and in some respects closely resembles a tin can.

An example of such a motor is illustrated in U.S. Pat. No. 4,207,483 to Baer wherein a relatively simple construction for a stepping motor facilitates a relatively low selling price. The simple construction of the stepping motor is provided by a small number of parts which are not overly complex in design. Furthermore, the construction is without great tolerance demands and thereby enables relatively inexpensive manufacturing. Also, the assembly process is not overly complicated. All of the foregoing features combine to realize a motor that is at the same time relatively inexpensive and yet maintains reasonable performance characteristics.

In order to simplify the mechanical construction disclosed in the Baer patent, the motor requires each set of interdigital pole teeth to be formed of two annular stampings, one in contact with the metal shell housing and forming half the teeth, and the other in contact with an internal hub and forming the other half of the teeth. The teeth extend radially from a base portion of each stamping. On the stamping supported by the internal hub, the teeth extend radially outwardly. In a complementary manner, the teeth of the stamping supported by the housing extend radially inwardly and are circumferentially interleaved with the teeth extending radially outwardly. A conventional cylindrically wound coil is associated with the teeth such that when energized, the flux paths to the teeth traverse the housing and the internal hub. The magnetic poles thus formed by the teeth extend radially from their supporting and flux-carrying structures—i.e., the housing and the internal hub.

Although the foregoing structure provides an inexpensive stepping motor having performance characteristics suitable for many applications, the complex magnetic circuit that results from this structure leads to an imbalance in the magnetic paths which is dependent on the particular mode of energizing the coil.

SUMMARY OF THE INVENTION

In view of the foregoing, it is a primary object of the invention to provide a stepping motor which is at least as simple and inexpensive to manufacture as the motor described in the Baer patent, while avoiding its unbalanced flux path characteristics.

It is another object of the invention to provide a stepping motor wherein the flux paths coupling the rotor and the stator are relatively direct and balanced, regardless of the mode of energization of the stator windings.

It is an additional object to provide such a stepping motor which includes relatively few parts, simple assembly and is, therefore, low in manufacturing cost.

It is yet another object of the invention to provide a motor structure that is just as accurate, low cost and easy to manufacture as a motor construction having two opposed stator assemblies, yet smaller in size.

Still another object of the invention is to provide a stepping motor that does not require the precise positioning of a disc rotor between two opposing stator assemblies in order to balance the alternating electromotive forces (emf) imparted to the rotor by each stator assembly.

It is also an object of the invention to maintain balanced flux path characteristics while providing a motor construction that is smaller in size than a motor construction having two opposed stator assemblies.

It is a more detailed object of the invention to providing a stepping motor that is not susceptible to the back-and-forth slapping of a rotor assembly in a motor construction having two opposed stator assemblies.

To achieve the foregoing objections, there is provided an axial pole stepping motor wherein the stator assembly includes a plurality of salient pole pieces extending parallel to the rotational axis of the drive shaft of the motor with the poles arranged into at least two groups and evenly spaced within each of the two groups such that the poles of each group may be axially aligned with the north-south poles of a permanent magnet disc rotor; however, the two groups are circumferentially offset from each other such that the salient poles of both groups cannot be simultaneously aligned with the north-south poles of the rotor. The circumferential offsetting of the two groups defines a stepping angle for the rotation of the motor shaft. In order to energize the axially extending salient poles, each group of poles is associated with a continuous skein winding woven in a labyrinth pattern between and among the poles of the group.

In a first embodiment of the invention, each group of stator poles is supported by a separate yoke assembly. The two groups of poles are positioned on opposite sides of the permanent magnet rotor and are both axially aligned with it. The poles of each group are circumferentially evenly spaced, with one of the groups circumferentially offset from the other so that poles of different groups are not axially aligned.

In a second and preferred embodiment each group of stator poles are supported on a common yoke such that they all are positioned on one side of the rotor. Each group of poles are defined by a number of adjacent poles evenly spaced with respect to one another. A circumferential gap between adjacent groups of poles defines an offset which provides a step angle. In order to provide stability and a high degree of stepping angle accuracy in all modes of energizing the skein windings, an additional axially extending pole piece is added to the circumferential gap defining the offset between the two groups of axially extending poles. This additional pole piece is not associated with a skein winding and therefore does not form a salient magnetic pole.

Other objects and advantages will become apparent upon reference to the following detailed description when taken in conjunction with the drawings.

BRIEF DESCRIPTION OF THE DRAWINGS

FIGS. 16a-d illustrate the stator and rotor of the motor in FIG. 8 modified to incorporate the stator assembly of FIG. 14 and section and unrolled as in FIGS. 15a-d to show the positioning error of the motor in each of the four static positions of a complete energization cycle of the stator windings according to the first mode of energization;

FIGS. 17a-d illustrate the stator and rotor of the motor of FIG. 8 sectioned and unrolled as in FIGS. 15-16 to show the positioning error of the motor in each of the four static positions of a complete energization cycle of the stator windings according to a second mode of energization;

FIGS. 18a-d illustrate the stator and rotor of the motor of FIG. 8 modified to incorporate the stator assembly of FIG. 14 and sectioned and unrolled as in FIGS. 15-17 to show the positioning error of the motor in each of the four static positions of a complete energization cycle of the stator windings according to the second mode of energization;

FIG. 19 is a graph of the estimated relative dynamic torque errors imparted to the two motors in FIGS. 15-18 when they are energized in each of the first and second modes;

FIGS. 20a-d illustrate the estimated relative error waveforms for each of the two motors in FIGS. 15-18 energized in each of the first and second modes.

While the invention will be described in connection with preferred embodiments, there is no intent to limit it to those embodiments. On the contrary, the intent is to cover all alternatives, modifications, and equivalents falling within the spirit and scope of the invention as defined by the appended claims.

DETAILED DESCRIPTION OF THE PREFERRED EMBODIMENTS

Figure 1:
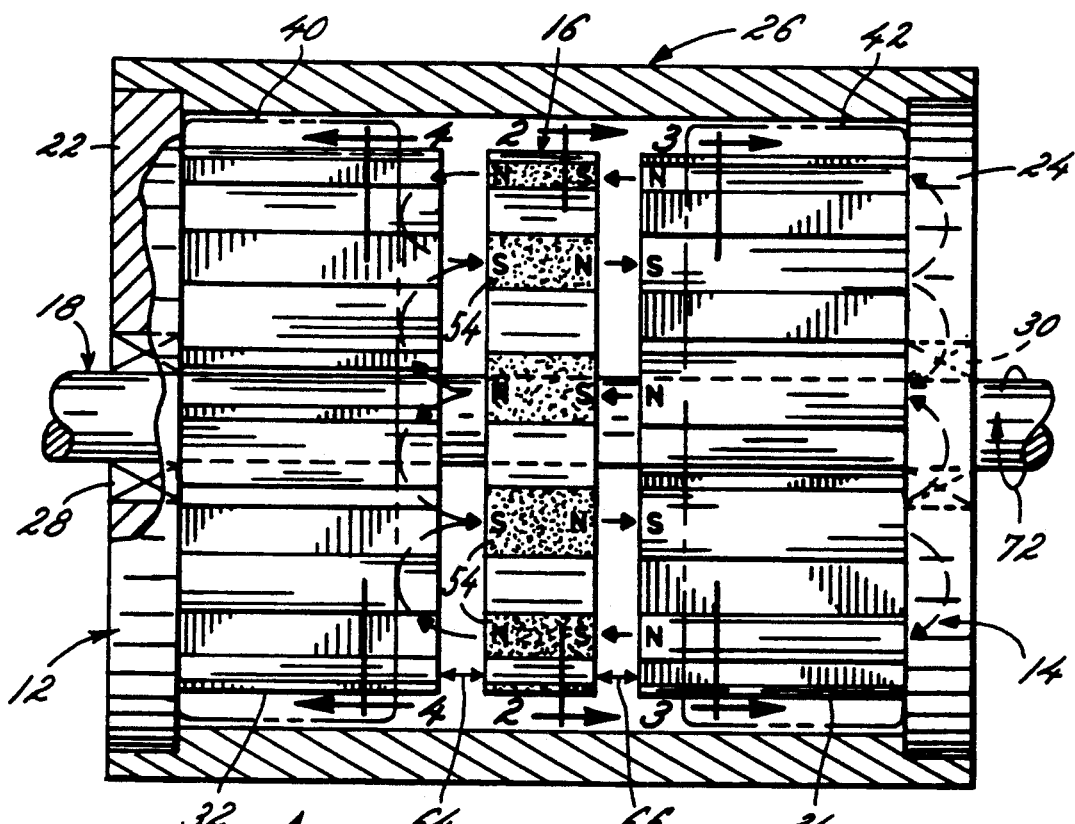
FIG. 1 is a partial sectional view taken along a longitudinal axis of one stepping motor exemplifying the present invention.

Turning to the drawings and referring first to FIG. 1, a first axial-pole stepping motor exemplifying the present invention is indicated by the reference character 10. The motor 10 includes a pair of preferably identical stator assemblies 12, 14 disposed on either side of a rotor comprising a permanent magnet disc 16, mounted on and keyed to an output shaft 18. Preferably, the output shaft 18 is affixed to the permanent magnet disc 16 by way of a non-magnetic coupling 20 (see FIG. 2). As explained more fully hereinafter, the stator assemblies 12, 14 produce a rotating magnetic field which causes the permanent magnet disc 16, and therefore, the output shaft 18, to rotate. The assembly is closed by a pair of end plates 22, 24, preferably formed as part of the stator assemblies 12, 14 and a cylindrical shell or housing 26 which, in combination with the end plates 22, 24, forms the external structure of the motor. The output shaft 18 is journaled in bearings 28, 30 fixed in the end plates 22, 24, respectively. As with the coupling 20, the bearings 28, 30 preferably also have a non-magnetic character such that the flux paths within the motor are isolated from the output shaft 18.

The axial pole motor 10 in FIG. 1 is shown partly in section (i.e., parts of the shell 26 and the end plate 22 are cut away) to reveal the details of the relative alignment of the rotor disc 16 and the stator assemblies 12, 14. Also for ease of illustration, the windings associated with the stator assemblies 12, 14 are only suggested by phantom lines in FIG. 1, but are more fully illustrated in FIGS. 3, 4 and 5. Since the stator assemblies are identical in the illustrated motor 10, only the stator assembly 12 will be discussed in detail. However, in order to reference both stator assemblies 12 and 14, numerical identifiers for the parts of stator assembly 14 are set out in parentheses in the following discussion.

Figure 5:
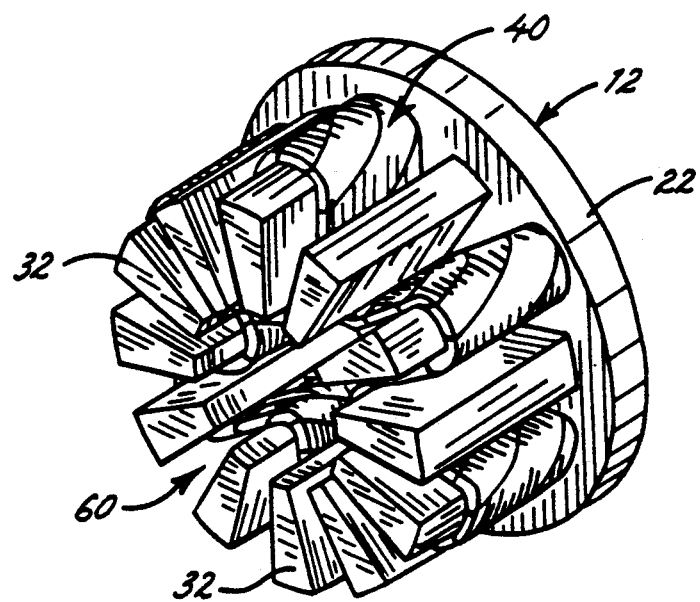
FIG. 5 is a perspective and isolated view of the right-hand stator assembly in FIGS. 1 and 3, including the associated winding.
Figure 3:
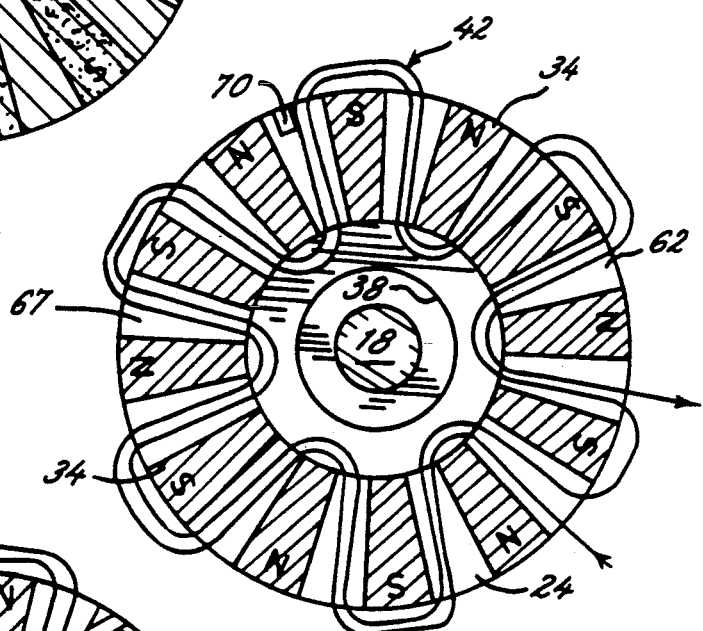
FIG. 3 is a sectional view taken along the line 3—3 of FIG. 1, showing the right-hand stator assembly.
Figure 4:
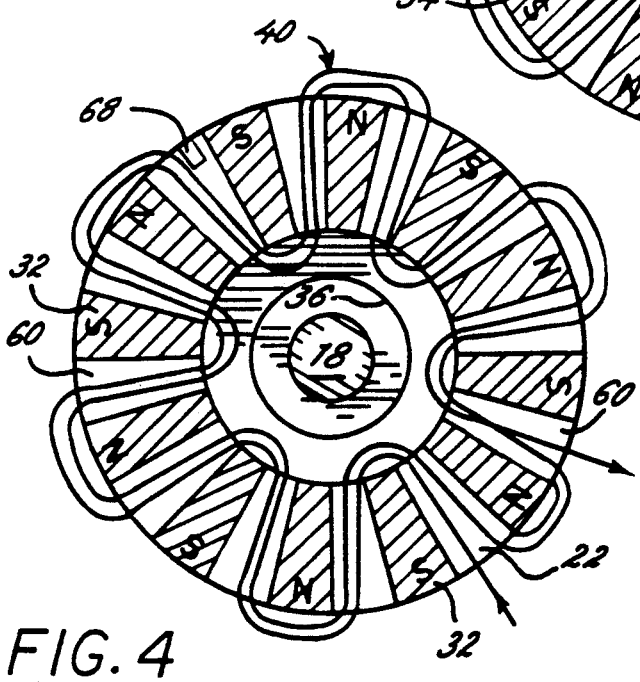
FIG. 4 is a sectional view taken along the line 4—4 of FIG. 1, showing the left-hand stator assembly.

In accordance with one important aspect of the invention, each of the stator assemblies 12, 14 is preferably in a salient pole configuration that includes a specially arranged electrical winding (see FIGS. 3, 4 and 5) which is energized in an appropriate sequence to create the rotating magnetic field. As best seen in FIGS. 3-5, each of the stator assemblies 12 (14) is a unitary, high permeability metallic element, defined by a cylindrical yoke or end plate 22 (24) having a plurality of pole pieces 32 (34) extending therefrom. An aperture 36 (38) in the center of the yoke 22 (24), along the longitudinal axis of the assembled motor 10, is provided for receiving one of the shaft-supporting bearings 28 (30). The poles 32 (34) extend in an axial direction away from the yoke 22 (24) and toward the permanent magnet disc 16 when the motor is assembled.

Figure 6:
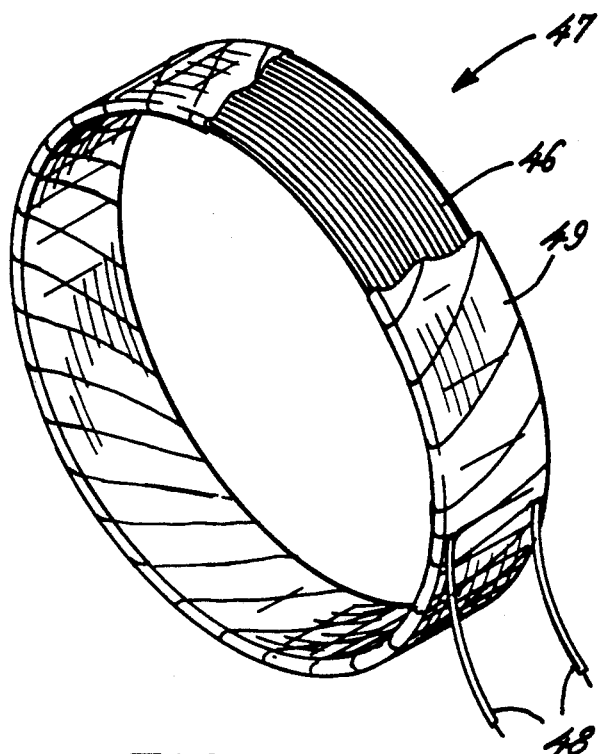
FIG. 6 is a perspective view of the skein winding configuration of a coil before it is deformed for positioning on the teeth of the stator assembly as the stator winding.
Figure 7:
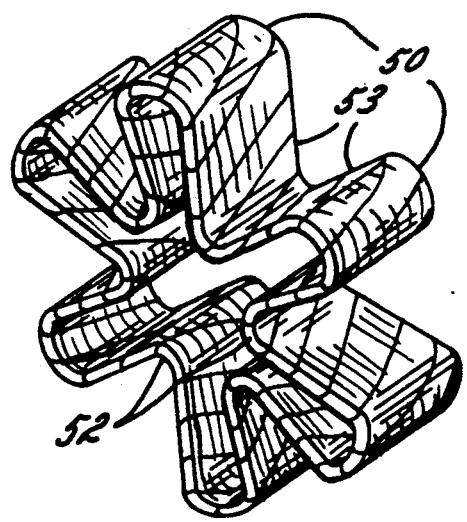
FIG. 7 is a perspective view of the coil of FIG. 6 after it has been deformed to form a labyrinth path that fits over the teeth of one of the stator assemblies.

In order to form the salient pole configuration, the electrical winding associated with the stator assembly 12 (14) is a specially formed skein winding 40 (42) which interfits between the poles 32 (34) of the stator assembly. FIG. 6 schematically shows the specially arranged electrical winding as being simply a length of wire 44 that is looped to form a skein winding 40 (42) having a pair of ends 46 which serve as electrical leads in a conventional fashion. The structure integrity of the skein winding 40 (42) can be increased by taping or the like as suggested at 48. Having formed the skein winding 40 (42) as illustrated in FIG. 6, it is necessary to deform the coil 50 to follow a labyrinth path such that when the deformed coil 50 is associated with the stator assembly 12 (14), it fits around the poles 32 (34), creating the windings that render the poles pieces as salient magnetic poles of the stepping motor, as illustrated in FIG. 7.

Because of the stator assembly 12 (14), particularly the poles 32 (34), are the primary flux carrying members within the stepping motor, the stator assemblies are formed of high permeability metal such as soft iron. The assemblies 12 (14) may be cast (or even machined in small prototype quantities) but preferably are formed as a sintered metal composite using conventional powdered-metal technology. In that case, a mold is provided in the shape of the stator assemblies 12 (14) Powdered metal of the appropriate characteristics is placed in the mold, compressed to form a compacted unit and then sintered at high temperature to produce the cast unitary assembly. Minimal clean-up machining is usually necessary using such a procedure, with clean-up being typically the provision of appropriate surface finishes where desired, such as at the flanges of the end plates and in the bearing-receiving recesses.

Figure 2:
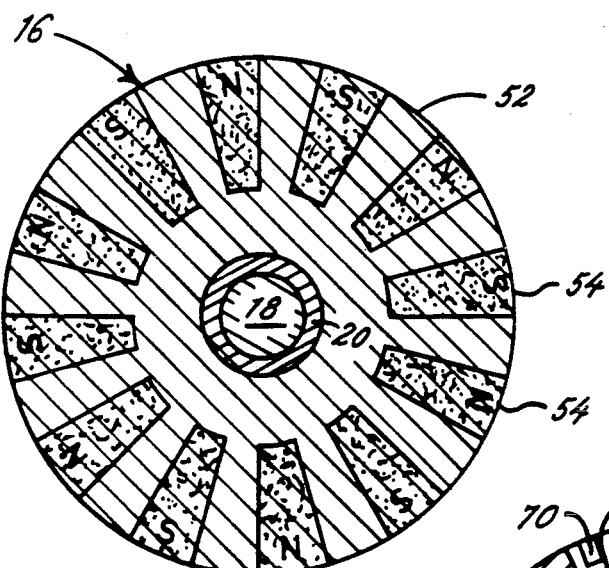
FIG. 2 is a sectional view taken along a line 2—2 of FIG. 1, showing the permanent magnet rotor disc.

Turning briefly to FIG. 2, there is shown the permanent magnet disc 16 which cooperates with the stator assemblies 12, 14 to cause rotation of the motor. Typically, the permanent magnet disc 16 is a ceramic disc 52 magnetized by conventional means to produce a plurality of permanent magnet segments comprising alternate north-south poles 54 equidistantly and circumferentially spaced around the disc. It is also possible, of course to use a disc 52 of non-magnetizable material and provide a series of small permanent magnet inserts at the appropriate spacing to provide the disc with its permanent magnet character. In the illustrated embodiment and as best seen in FIG. 1, the segments 54 are magnetized such that each pole is axially disposed, having a north pole (N) on one planar surface of the disc and its corresponding south pole (S) on the other, with adjacent segments having their direction of magnetization reversed with respect to one another.

When using a ceramic disc which is magnetized by external forces, a fixture can be utilized having a series of appropriately spaced salient poles which are energized to magnetize the ceramic material of the disc in generally pie-shaped segment suggested by FIG. 2. It will be appreciated, of course, that when magnetizing a ceramic disc in this way, the degree of magnetization within any segment is not constant, and the dividing lines between north and south segments are not quite so sharply drawn as suggested in the drawings, although for practical purposes in a motor the idealized case illustrated in the drawings is more than adequate for a complete understanding.

FIG. 7 shows the deformed skein winding 50 following an appropriate labyrinth path having a plurality of outer and inner peripheral portions 54 and 56, respectively. Each outer peripheral portion 54 is adapted to fit over the exterior portion of a stator pole 32 (34), and an adjacent internal peripheral portion 56 is adapted to fit around the inside of an adjacent pole such that intermediate sections 58 of the winding fit within and substantially fill gaps 60 (62) formed between the adjacent poles 32 (34).

The skein winding 40 (42) of FIG. 6 can be formed by hand into the configuration 50 of FIG. 7 before it is placed over the poles 32 (34) of the stator assembly 12 (14) or an appropriate fixture can be used. One such fixture includes a series of dowels (not shown), with half the dowels on the fixture being fixed and in positions to establish the outer peripheral portions 54 of the skein winding of FIG. 7, and the other half being interspersed between the fixed dowels and movable from an initial position defining a circle of larger diameter than the fixed dowels. When in this initial position, the skein winding 40 (42) is inserted into the fixture, and the movable dowels transposed radially inwardly to deform the coil, the movable dowels ultimately assuming a position which defines the inner peripheral portions 56 of the skein winding of FIG. 7.

In the embodiment illustrated in FIG. 1-5, the stator assemblies 12 (14) includes a series of twelve poles 32 (34) separated by gaps 60 (62) equidistantly and circumferentially spaced around the periphery of the yoke 22 (24). The gaps 60 (62) allow the insertion of the skein winding 40 (42) such that the skein fits within the gaps 60 (62). Furthermore, the winding encircles three sides of each pole 32 (34) such that every other tooth is wrapped by the winding from inside to outside and the remaining poles are wrapped from outside to inside. Thus, if the winding 40 (42) is energized to provide current flow in a particular direction, half of the poles 32 (34) will be magnetized as north salient poles and the other half, interspersed between the first half, will be magnetized as south salient poles. Reversal of current flow through the winding 40 (42) will thereupon reverse the magnetization to provide south salient poles where the north poles had originally been and north salient poles where the south poles had originally been.

When assembled, the permanent magnet disc 16 is disposed between the stator assemblies 12, (14) with respective air gaps 64, (66) separating the poles from the permanent magnet disc as shown in FIG. 1. The air gaps 64, (66) are preferably kept small and approximately equal to each other so that the magnetic characteristics of the axial-pole motor are the same with respect to either stator assembly 12 or 14. The disc assembly 16 can be held in the appropriate axially aligned position by means of stop members (not shown) associated with the shaft 18 and cooperating with the bearings 28, (30) to achieve the appropriate axial position and thereby determine the gaps 64, (66). In addition, appropriate thrust washers (not shown) can be used to prevent or minimize the tendency of the disc 16 to move toward the stator assembly which is energized at the moment and thus to "slap" from side to side as the stators are alternately energized and deenergized.

In keeping with the first embodiment of the invention, the non-energized stator assembly 12 (14) provides a closely positioned, low reluctance return path for the flux generated by the energized stator assembly. Such a path provides the most direct return possible. In the illustrated embodiment, the direct return path is provided by disposing the stator assemblies 12 and 14 opposite each other with the poles 32, (34) facing the disc 16, and offset by one-half of the pole pitch such that the poles of one of the stator assemblies are opposite the gaps 60, (62) of the other stator assembly as best illustrated in FIG. 1. Relative alignment of the stator assembly 12 and 14 can be accomplished by appropriate keys and recesses in the stator assemblies and cylindrical housing 26 as indicated by slots 68, (70) in the yokes 22, (24), respectively, as best seen in FIGS. 3 and 4.

In practicing the invention, the assembly described thus far achieves substantially balanced and simplified flux paths from the energized stator assembly 12 (14) through the permanent magnet disc 16, thereby providing consistent operation independently of the mode of energization. For example, in the position illustrated in FIG. 1, and assuming the winding 42 of the right-hand stator assembly 14 is energized with current flow in a given direction termed "positive" here, the salient poles 34 of the right-hand stator will be magnetized with alternating north-south poles as illustrated by the N and S designators in FIG. 3. Energization in that fashion will cause the disc 16 (with attached output shaft 18) to rotate to the position shown in FIG. 1 where the south poles of the permanent magnets on the disc 16 will align with the north poles on the stator, and the north poles on the disc will align with the south poles on the stator.

With the poles of the two stator assemblies offset as described, step rotation of the rotor disc 16 is accomplished by alternately exciting the stator windings. For example, the poles 32 of the left-hand stator assembly 12 provide a low reluctance flux return path for flux emanating from the north poles formed at the poles 34 of the energized stator assembly 14 as suggested by the flux lines in FIG. 1. To complete the return path, the flux passes through the permanent magnet disc 16 and returns via the disc to the south poles formed from the poles 34 of the energized stator assembly 14. Thus, the flux paths are direct and largely metallic. Specifically, the flux paths are substantially confined to (1) the air gaps 64 (66) between the rotor disc 16, (2) the energized poles 32 (34) of the stator assemblies 12 (14) (acting as the salient poles and thus the source of the flux), and (3) the non-energized pole pieces 52 (54) which are positioned to provide a low reluctance return path for the flux.

When it is desired to step the motor in the illustrated embodiment, the skein winding 42 associated with the right-hand stator assembly 14 is deenergized and the skein winding 40 associated with the left-hand stator 12 is energized in a given direction to produce alternate north-south poles as suggested by the dashed N's and S's in FIG. 4. In response, the disc assembly 16 will rotate one step in the direction identified by an arrow 72 (FIG. 1) such that the central portion of the north poles of the permanent magnets are aligned with the south poles of the energized stator assembly 12 and the south poles of the disc 16 are aligned with the north poles of the stator assembly 14. At the conclusion of this step, it will be appreciated that the poles 34 of the non-energized stator 14 will provide flux return paths which are substantially identical to those previously described for the poles 3 when the stator assembly 12 is non-energized.

For the next rotational step of the shaft 18, the winding 40 associated with the stator assembly 12 will be deenergized and the winding 42 associated with the right-hand stator assembly 14 energized in the opposite direction relative to the first step to produce alternating north-south poles with the south poles being positioned where the north poles had been in the first step and the north poles where the south poles had been. Thus, the motor will step one more step in the direction 72. Operation continues by deenergizing the right-hand stator 14 and energizing the left-hand stator 12 in the opposite direction, thereby completing a four-step sequence. The four-step sequence continually repeats so long as rotation in the direction 72 is desired. When it is desired to rotate the motor in the opposite direction, the sequence of energization is reversed, thereby reversing the direction of disc rotation.

From the foregoing, it can be seen that a simple motor construction is provided wherein the poles 32, (34) of the stator assemblies 12, (14) provide salient electromagnetic poles and are realized by way of a simple structure using a yoke 22, (24) for a base from which the poles axially project. Each of the windings 40, (42) which allow the poles 32, (34) of each stator assembly 12, (14) to function as salient poles is also simply configured, initially being formed as a simple skein and then formed into a labyrinth path 50 conforming to the gaps 60, (62) surrounding the pole pieces. The deformed windings 40, (42) can be simply inserted over the poles 32, (34) thereby wrapping the poles in alternately opposite directions to provide alternately opposite salient poles when energized and producing a magnetic structure which does not rely on extraneous elements (e.g., shaft hub axial segments of the motor enclosure and the like) to convey flux from the winding to the poles.

The skein windings 40, (42) and pole pieces 32, (34) are not only simply made, but when assembled, each of the windings is directly and physically associated with the pole piece and the wrapping is such that when current is passed through the winding, the pole pieces are directly magnetized in alternating fashion. That direct association of the skein windings 40, (42) and pole pieces 32, (34) in such a simplified structure, in combination with the backing provided by, for example, the flux return path of the poles in the opposite stator assembly produces a motor which is not only simple, but has operating characteristics which are exceptionally good for a motor of such simple and inexpensive construction.

It will be appreciated by those skilled in the art that the above description sets fort the important features of the two-sided stator embodiment of the invention but does not specify all of the details of each potential permutation of applications of this embodiment, since such details will be apparent to those skilled in this art. For example, drive circuits for producing the sequential operation described above are well known and can be built or purchased for providing drive currents of the appropriate direction, phase and sequence to produce the operation desired for any particular application.

Furthermore, the two-coil alternate energization scheme described above represents a simple case useful for explaining without obscuring the invention; those skilled in the art will appreciate that other energization schemes are possible including multiple phases, schemes with more than one phase energized at a particular time, and utilizing different reversal schemes. Those skilled in the art will appreciate that the center-to-center spacing of the pole pieces, in combination with the center-to-center spacing of the permanent magnet segments on the disc define the step angle of the motor, and that energization schemes can be utilized which will provide not only full step operation, but also stepping at increments of the step, such as half-step operation. The number of poles can be varied to provide various step angles as desired.

During operation of a two-sided stator motor, the salient poles of the opposing stator assemblies 12, (14) are alternately energized in order to create a rotating electromagnetic field that rotates the rotor 16. During this alternating energization of the salient poles, the rotor 16 tends to be drawn toward alternate ones of the stator assembly, thereby imparting a back-and-forth slapping motion to the rotor. Conventional thrust washers may be used to minimize this side-to-side motion, however, it cannot be totally eliminated. Also, the addition of thrust washers adds to the expense of the motor. Furthermore, although the two-sided stator motor embodiment is compact, it is too large for some applications, and a further size reduction—without increased expense of construction—would be highly desirable.

Figure 8:
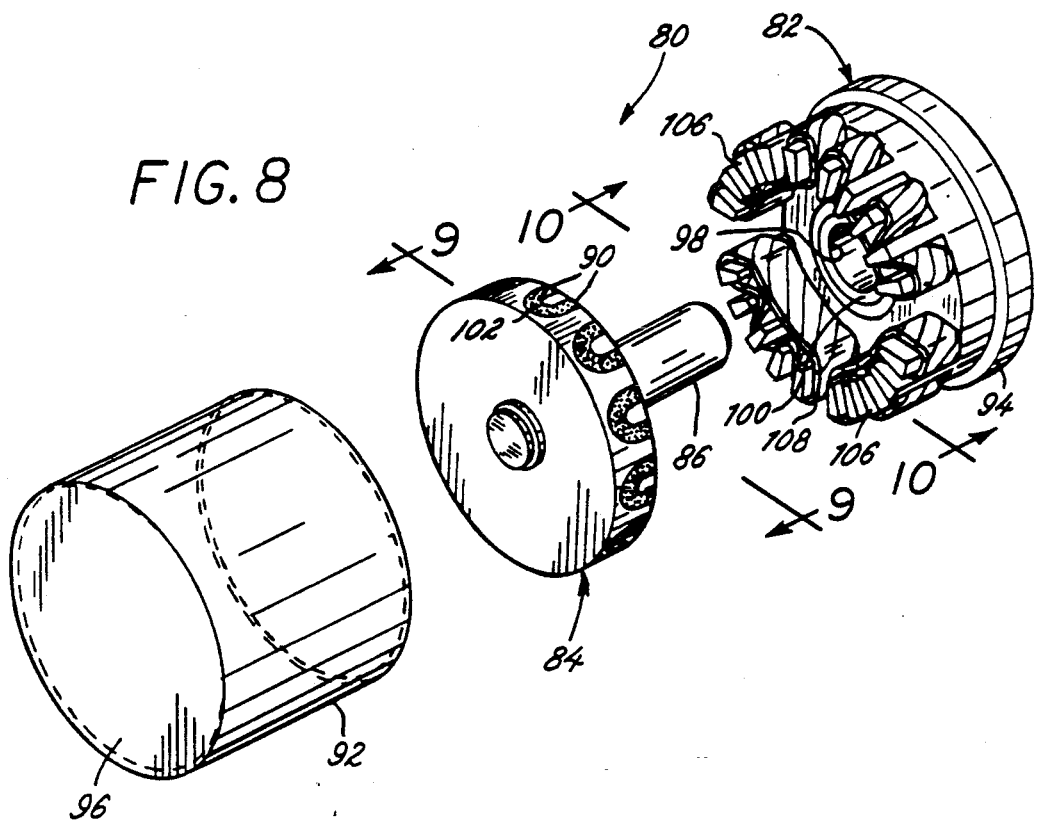
FIG. 8 is an elevated and exploded perspective view of the structure of a second stepping motor in accordance with the present invention.
Figure 9:
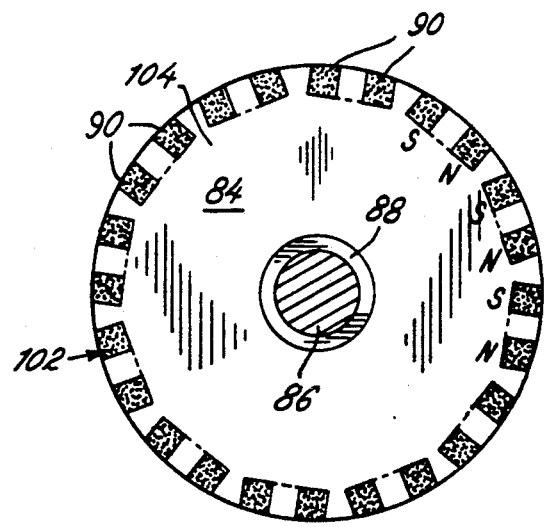
FIG. 9 is a plan view taken along the line 9—9 of FIG. 8, showing the permanent magnet rotor disc.

Referring now to FIG. 8, a very compact axial pole stepping motor illustrating the preferred embodiment of the present invention is indicated generally by the reference numeral 80. The motor 80 includes a single stator assembly 82 disposed on one side of a permanent magnet rotor 84, mounted on and keyed to an output shaft 86. Preferably, the output shaft 86 is affixed to the permanent magnet rotor 84 by way of a non-magnetic coupling 88 (see FIG. 2). The stator assembly 82 is similar in construction to the stator assemblies 12, (14).

As explained above in connection with the first embodiment of the invention, the stator assembly 82 produces a rotating magnetic field which causes the permanent magnet rotor 84, and therefore the output shaft 86, to rotate. As in the rotor 16 of the first embodiment, the rotor 84 includes a plurality of permanent magnet segments 102 having alternating north-south poles 90 equally and circumferentially spaced around the perimeter of its disc-like shape. The permanent magnet rotor 84 responds to the rotating magnetic field generated by the stator assembly 82 by rotating in an attempt to continually place its alternating north-south poles 90 at an equilibrium position within the field.

Unlike the rotor 16, however, each permanent magnet 102 of the rotor 84 is magnetized in a horseshoe configuration such that each pole 90 is on the same planar surface 104 of the disc 82. The north and south poles of each permanent magnet segment are spaced one from the other, with adjacent segments or regions having their directions of magnetization reversed with respect to one another. The stator assembly 82 and rotor 84 are encased by a cylinder or shell 92 that is closed at its ends by a pair of end plates 94 and 96. The end plate 94 is formed from a yoke of the stator assembly 82 which, in combination with the end plate 96 and cylinder 92, forms the external housing of the motor 80. An aperture 98 in the center of the yoke or end plate 94 is provided for receiving a shaft-supporting bearing 100.

The housing portions 92, 96, preferably will be formed of non-magnetic material.

The output shaft 86 is journaled in the bearing 100 in the end plate 94. It will be appreciated, however, that a second bearing (not shown) fixed to the end plate 96 may provide additional rotational support for an extension of the shaft 86 if required. In most applications, the bearing 100 is sufficient. Additionally, a single bearing journal provides a more simple and less expensive construction. As with the coupling 88, the bearing 100 preferably also has a non-magnetic character such that the flux paths within the motor 80 are isolated from the output shaft 86.

Typically, the rotor 84 is a ceramic disc magnetized to produce the alternating north-south poles 90 similar to the rotor 16. It is possible, of course, to use a disc 84 of non-magnetizable material and provide a series of small permanent magnet inserts at the appropriate spacing in order to give the disc a permanent magnet character.

When the rotor 84 is a ceramic disc magnetized by external forces, a fixture may be utilized having a series of appropriately spaced salient poles that are energized to magnetize the ceramic material of the disc in the horseshoe shaped magnetic segments 102. The rotor 84 is magnetized by an assembly similar in configuration to one of the stator assemblies 12, 14. Again, it will be appreciated, of course, that when magnetizing a ceramic disc in this way, the degree of magnetization within any segment is not constant, and the dividing lines between each north or south segment and the circumferentially adjacent non-magnetized ceramic materials are not quite so sharply drawn as suggested in the drawings. For practical purposes, however, the idealized case illustrated in the drawings is more than adequate for a complete understanding of the invention.

In keeping with the invention, the stator assembly 82 includes a plurality of teeth 106 extending along the longitudinal axis of the output shaft 86 from the yoke 94 and toward the permanent magnet segments 90 of the rotor 84. The teeth 106 are arranged into at least two groups which are evenly spaced within each of the groups so that the teeth of each group may be axially aligned with the north-south poles of the rotor. Unlike the embodiment of FIGS. 1-7, however, the at least groups are located on the same side of the rotor 84 and they are circumferentially offset from each other such that the teeth 106 of both groups cannot be simultaneously aligned with the north-south poles of the rotor. By associating specially configured electrical windings with each of the groups of teeth, a salient pole configuration is provided at the stator which is energized in one of several predetermined modes of energization in order to create a rotating magnetic field for rotating the rotor 84 and output shaft 86 in incremental steps.

Because the stator assembly 82, particularly the teeth 106, are the primary flux-carrying members within the stepping motor 80, the stator assembly is formed of high permeability metal such as soft iron. Like the assemblies 12, 14, the stator assembly 82 preferably is formed as a unitary structure and may be cast or even machined in small prototype quantities, but it preferably is formed as a sintered metal composite using conventional powdered-metal technology. In that case, a mold is provided in the shape of the stator assembly 82. Powdered metal of the appropriate characteristics is placed in the mold, compressed to form a compacted unit and then sintered at a high temperature to produce a cast unitary assembly. Minimal clean-up machining is usually necessary using such a procedure, with clean-up being typically the provision of appropriate surface finishes where desired, such as at the flanges of the end plates and in the bearing-receiving recesses.

In order to form the salient pole configuration, each electrical winding associated with the stator assembly 82, again is a specially formed skein winding, like the windings 40, 42 which fits between the teeth 106 of the stator assembly 82. Having formed the skein winding 40 as illustrated in FIG. 6, it again is necessary to deform the winding to follow a labyrinth path such that when the deformed winding 108, see FIGS. 10 and 11, is associated with the stator assembly 52, it fits around the teeth 106, creating one of the windings that renders the teeth as salient poles of the stepping motor.

In keeping with the preferred embodiment of the invention, each of the two groups of teeth 106 include a pair of subgroups. As they are positioned about the periphery of the yoke 94, each of the subgroups is diametrically opposite the other subgroup in the pair and separated from the other by the pair of subgroups of the other group. Reading clockwise in FIG. 10, the two pairs or four subgroups of teeth are A, B, C and D, where subgroups A, C are one pair and subgroups B, D are the other pair. The teeth 106 within each group A, B, C and D are separated by gaps 110 and equidistantly and circumferentially spaced about the periphery of the yoke 94. In order to offset the two pairs of subgroups, arcuate intergroup gaps 112 and 114 separate adjacent subgroups, such that continuations of the teeth 106 in the subgroups about the periphery of the yoke 94 will not result in the teeth from different groups exactly overlapping—that is, one pair of subgroups is circumferentially offset from the other pair.

Figure 10:
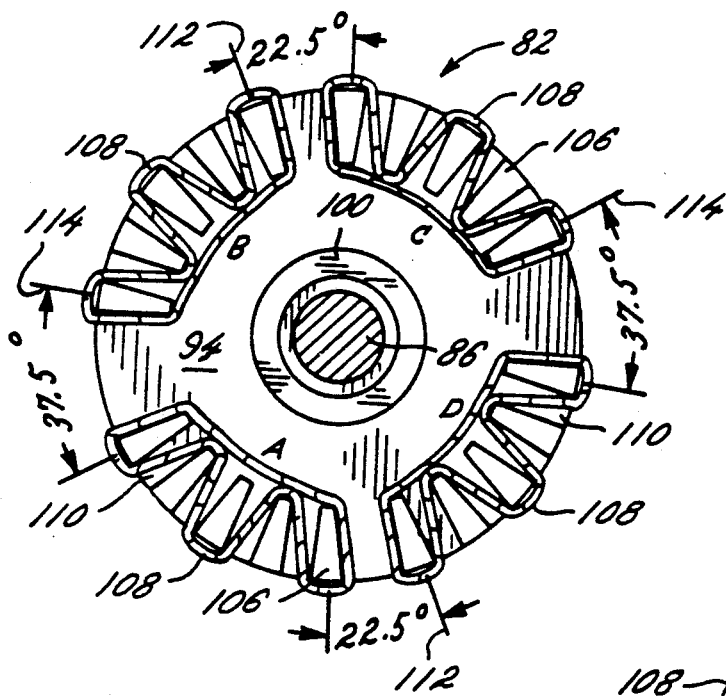
FIG. 10 is a plan view taken along the line 10—10 of FIG. 8, showing a configuration of the single stator assembly of the stepping motor for energizing the windings of the stator assembly in accordance with a first embodiment.

Referring specifically to the configuration of the teeth about the periphery of the yoke 94 as shown in the exemplary embodiment of FIG. 10, the center-to-center angle between adjacent teeth in a subgroup occupies an approximate 15 degree arc about the circumference of the yoke 94. Subgroups A and C are circumferentially aligned in that a continuation of the pattern of either subgroup would exactly overlap the other. Subgroups B and D are also circumferentially aligned. However, subgroups A and C as a pair are circumferentially offset from subgroups B and D as a pair. In order to offset the pairs of subgroups A, C and B, D from one another, the intergroup gaps 112 and 114 separating the subgroups define arcuate angles that are not integer multiples of the 15 degree spacing between teeth. In the illustrated embodiment of FIG. 10, a pair of the gaps 112 are diametrically opposite one another, separating and offsetting subgroups A from D and B from C. Each gap 112 defines an arcuate angle equal to one and one-half teeth—i.e., 22.5 degrees in the illustrated embodiment. Another pair of diametrically opposite gaps is formed by two intergroup gaps 114 wherein each gap defines a gap of two and one-half teeth—i.e., 37.5 degrees in the illustrated embodiment. Intergroup gaps 114 separate and offset subgroups A from B and C from D.

Figure 11:
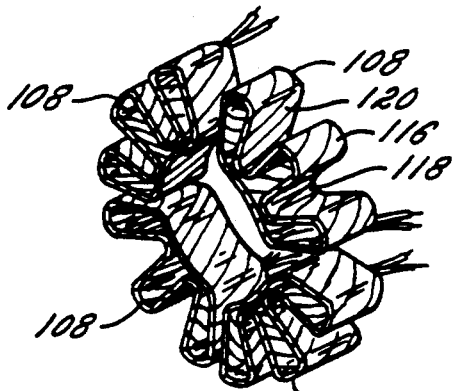
FIG. 11 is an elevated perspective view of four of the windings of FIG. 6 after they have been deformed to form a labyrinth path that fits over the teeth of the stator assembly.

Each of the skein windings 108 fits over the teeth of one of the subgroups A, B, C or D as best shown in FIG. 11. Since there are four subgroups A, B, C and D, there are also four windings 108A, B, C and D. Each winding 108 is deformed to follow an appropriate labyrinth path having a plurality of outer and inner peripheral portions 116 and 118, respectively. Each outer peripheral portion 116 fits over the exterior portion of a stator tooth 106, and the adjacent internal peripheral portion 118 fits around the inside of an adjacent tooth such that intermediate sections 120 of each winding fit within and substantially fill the gaps 110 formed between the adjacent teeth 106. Each skein winding 108A-D of FIG. 11 may be formed as described above with respect to FIGS. 6 and 7.

The gaps 110 between the teeth of each subgroup A, B, C and D allow the insertion of the associated skein winding 108 such that the skein fits within the gaps 110. Furthermore, the winding encircles three sides of each tooth 106 and all four sides of the end teeth in a group such that every other tooth in a subgroup is wrapped by the winding from inside to outside, and the remaining teeth are wrapped from outside to inside. Thus, if one of the windings 108 is energized to provide current flow in a particular direction, half of the teeth 106 of the subgroup will be magnetized as north salient poles and the other half, interleaved between the first half, will be magnetized as south salient poles. Reversal of current flow through the winding 108 will thereupon reverse the magnetization to provide south salient poles where the north poles had originally been and north salient poles where the south poles had originally been.

Figure 12:
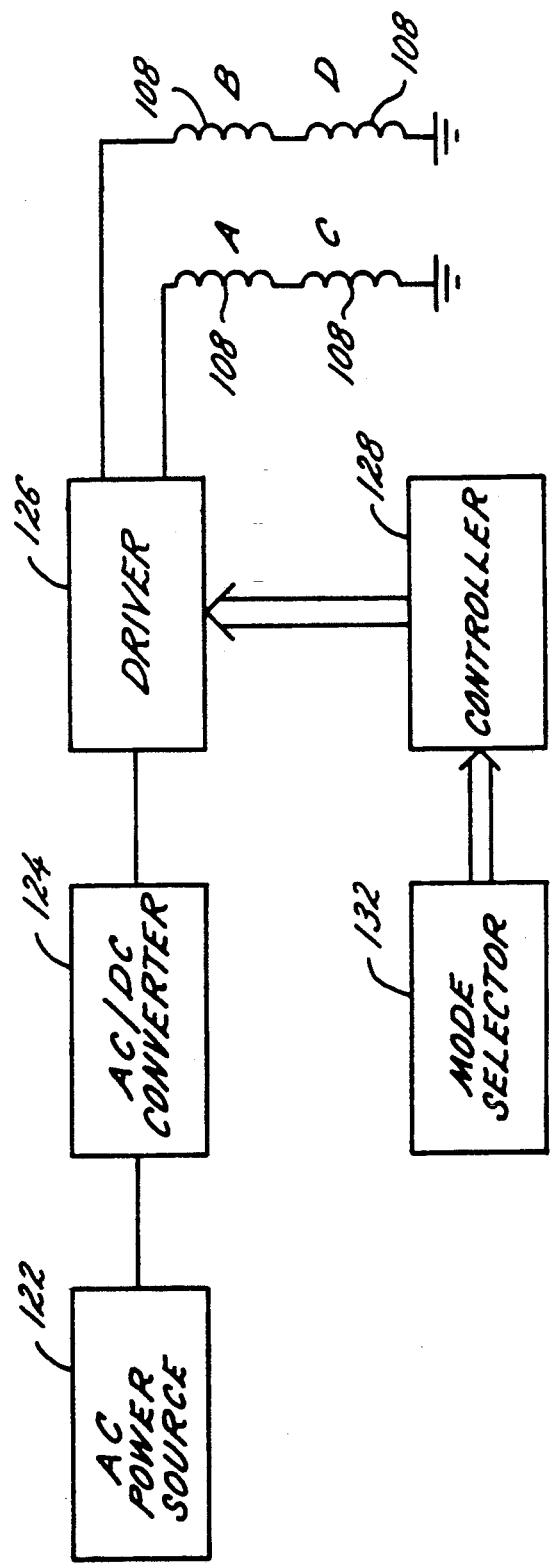
FIG. 12 is a block diagram of the control circuitry for energizing the windings of the stator assembly in at least two alternative modes.
Figure 13A:
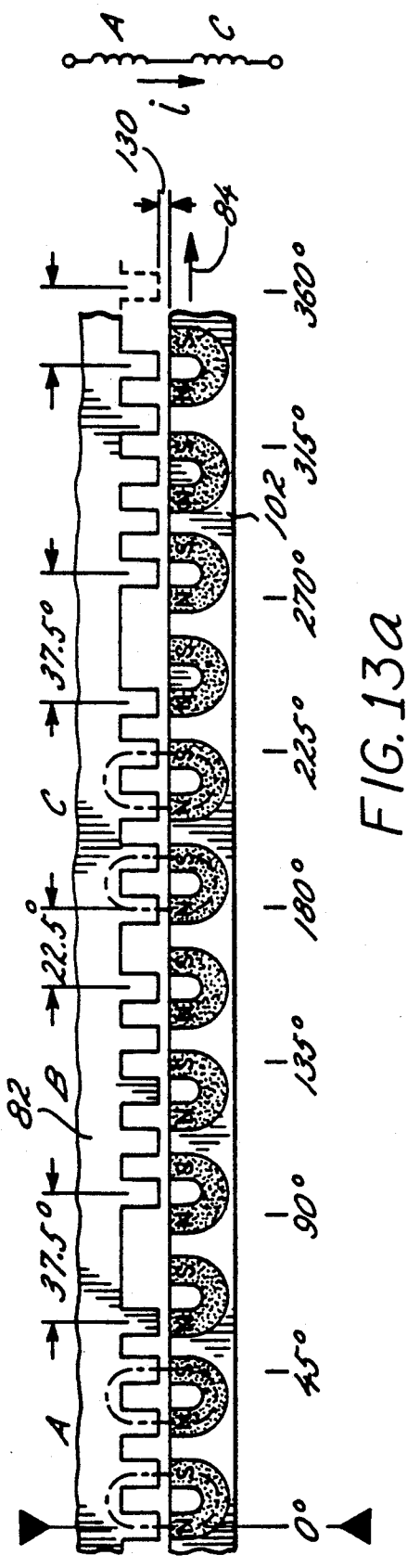
FIGS. 13a-d illustrate the stator and rotor of the motor in FIG. 8 sectioned and unrolled so as to provide a visually easy-to-understand illustration of the flux paths joining the stator and rotor during a first mode of energizing the stator windings.
Figure 13B:
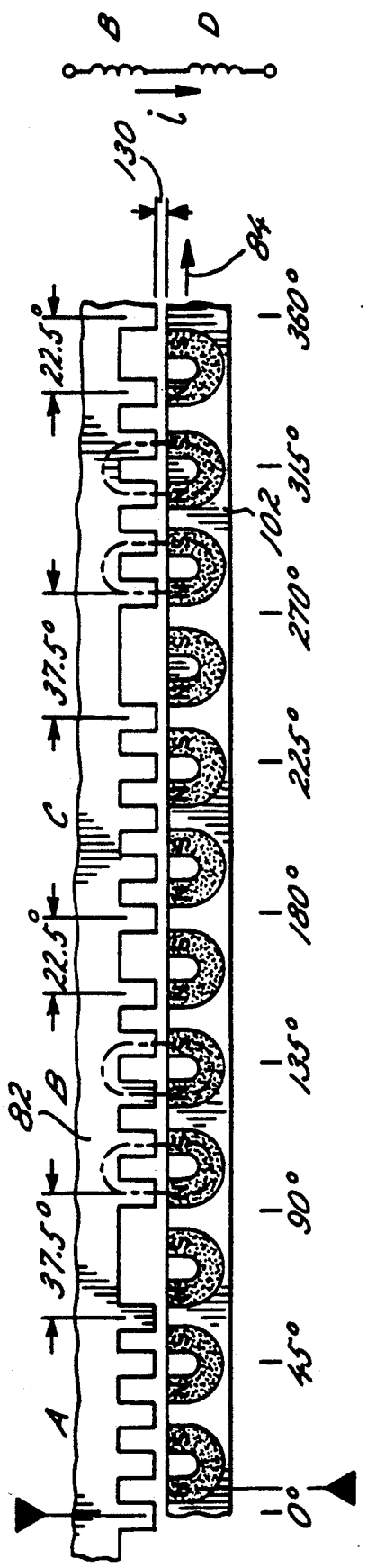
Figure 13C:
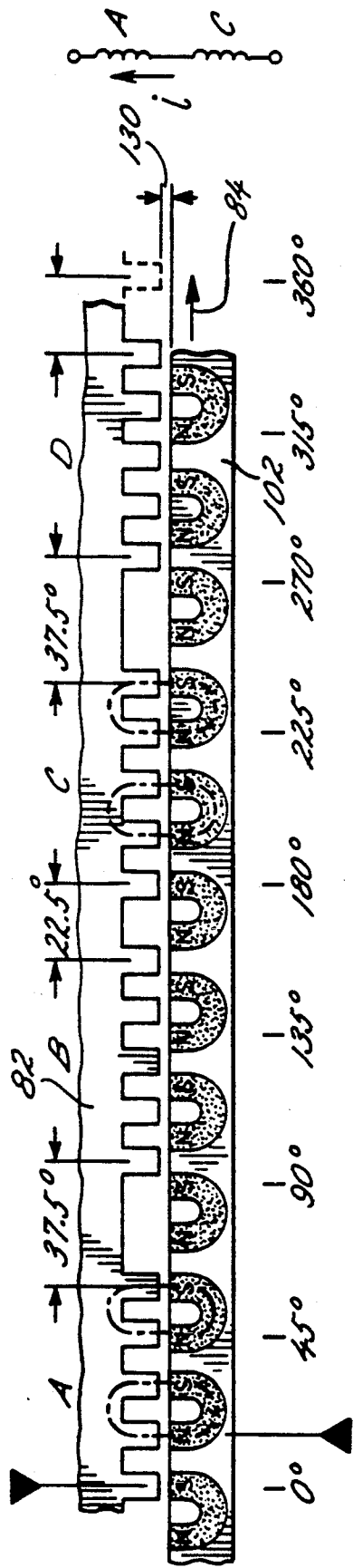
Figure 13D:
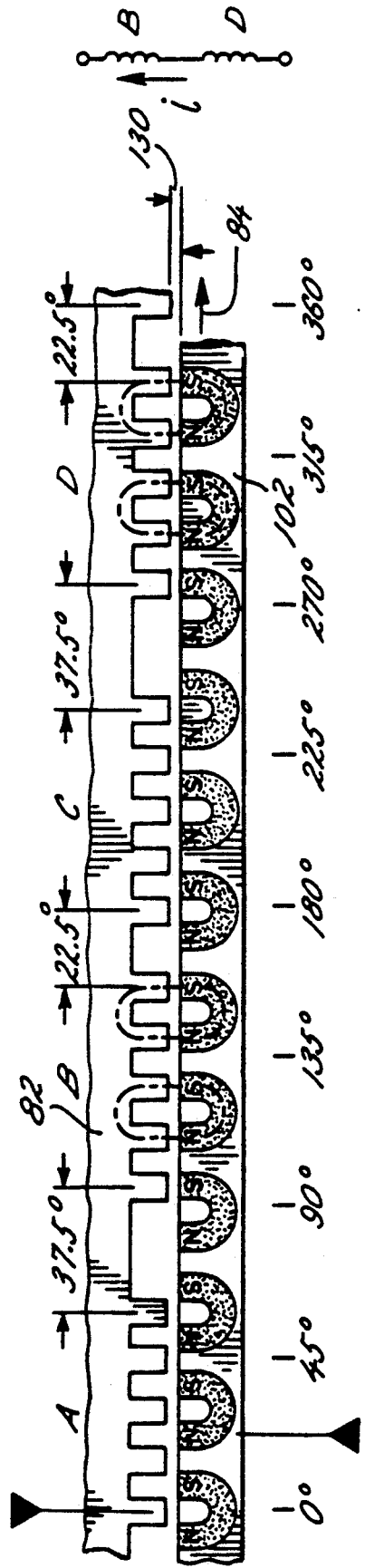

In order to energize the skein windings 108A, B, C and D in accordance with one of several predetermined modes, a conventional motor drive circuit is provided as illustrated in FIG. 12. As is well known in the art, AC power from an AC power source 122 is converted to DC voltage in a converter 124 before it is delivered to a conventional driver 126. In a manner well known in the art, the driver is under the control of a controller 128 of conventional construction. Because of the teeth 106 of subgroups A and C are not offset from one another and may simultaneously align with the permanent magnets of the rotor 84, the associated windings 108 and C, respectively, are connected in series. Similarly, the windings 108B and D associated with subgroups B and D, respectively, are series connected.

In a first mode of energizing the windings 108A, B, D and D, the series connected winding pairs A, C and B, D are sequentially energized as indicated in the sequence of FIGS. 13a-d. Specifically, the series connected pairs A, C and B, D are sequentially energized with current in a first direction and next sequentially energized with current in the reverse direction. By repeating this four-step sequence, a rotating electromagnetic field is developed that causes the rotor 84 to rotate in incremental steps as generally indicated in the sequence shown in FIGS. 13a-d. In this first mode of energization, the alternate north-south poles of the rotor 84 axially align with the salient poles formed by the energized teeth of either subgroup pairs A, C or B, D.

As can be appreciated from FIG. 13a-d, when assembled, the rotor 84 is disposed adjacent the stator assembly 82 with an air gap 130 separating the pole teeth of the stator assembly 82 and the surface 102 of the rotor 84 as suggested by FIGS. 13a-d and 14a-b. The air gap 130 preferably is kept small. The rotor 84 can be held in the appropriate axially aligned position by means of stop members (not shown) associated with the shaft 86 and cooperating with the bearing 100 to achieve the appropriate axial position and thereby determine the gap 130.

In keeping with the preferred embodiment of the invention as illustrated in FIGS. 8-13, the electromagnetic forces (emf) generated by the stator assembly 82 are all initiated from one side of the rotor 84, thereby eliminating the slapping of the rotor, such as the rotor 16, typically seen in motor constructions using two opposing stator assemblies. Furthermore, the careful positioning of the rotor 84 between two opposing stator assemblies in order to equalize the emf is made unnecessary in this motor embodiment, thereby making for a cheaper and easier assembly.

Figure 21:
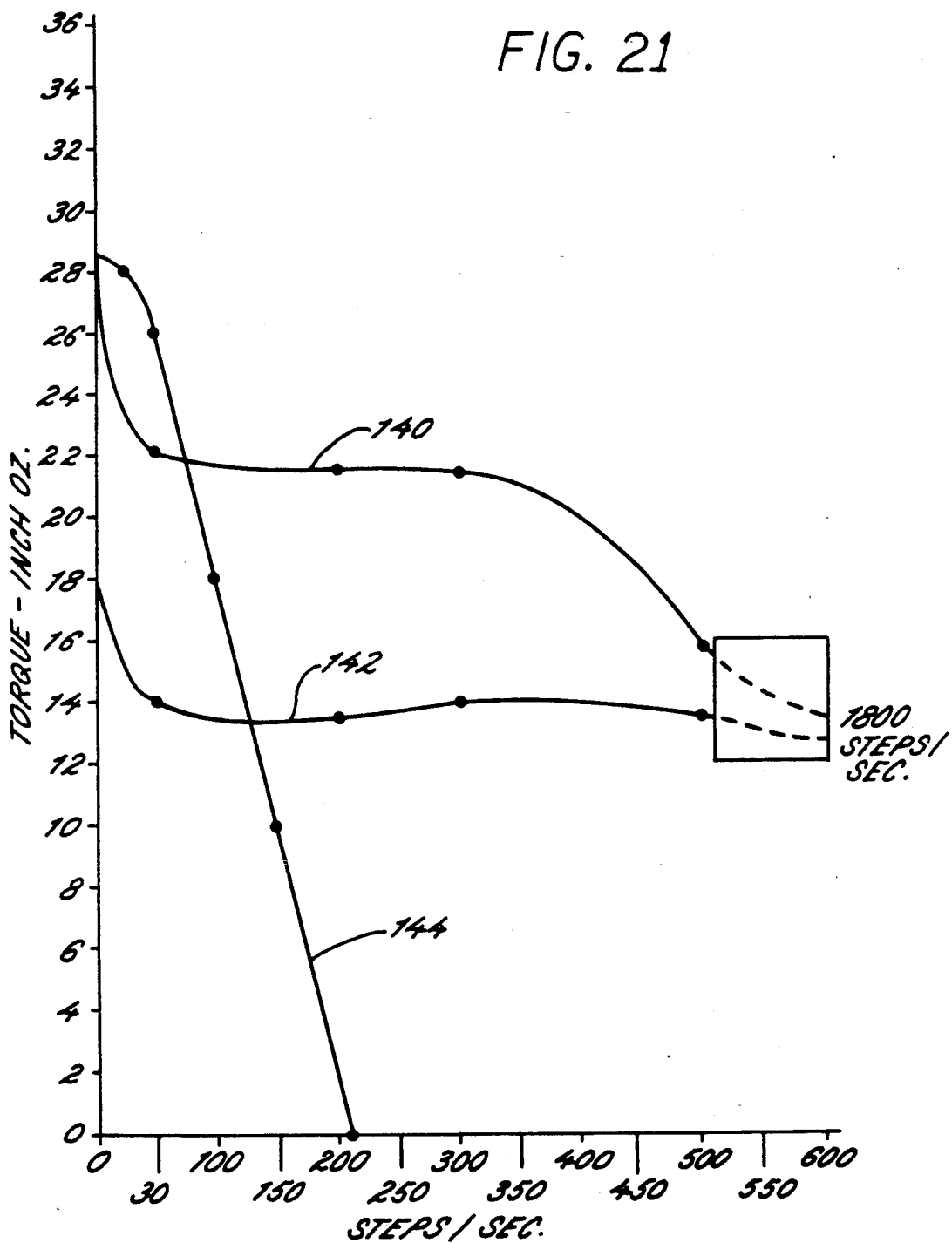
FIG. 21 is a graph of the torque performance of the stepping motor of FIG. 8 energized in each of the first and second mode, and compared to the typical performance of a conventional motor.

The flux path is formed by the flux from a salient pole of the stator assembly 82 passing to one of a north-south pole of the rotor 84, through the rotor 84 in the horseshoe path 102 and returning from the other rotor north-south pole to the salient pole of the stator assembly 82. The flux path only includes the stator assembly 82 and the rotor 84, which provides a high torque output as illustrated in FIG. 21. The motor assembly 80 of FIG. 8 and its single-phase mode of operation described thus far achieves substantially simplified flux paths from the salient poles formed by the stator assembly 82 to and from the permanent magnet disc of the rotor 84, thereby providing reliable and substantially accurate operation.

In accordance with another important aspect of the invention, applicants have found that increased accuracy and stability in the operation of the motor 80 of FIGS. 8 and 10 may be achieved if an additional pole tooth is added to the stator 82 in each of the pair of circumferential intergroup gaps 114 separating adjacent subgroups of stator poles. Applicants have established by empirical studies that by adding an additional pole tooth to each gap 114, the stability and accuracy of the motor steps are substantially improved. To add the extra pole teeth, the subgroup B of the stator 82, best seen in FIG. 10, is extended by one pole tooth in the counter-clockwise direction and the relatively offset subgroup C is extended by one pole tooth in the clockwise direction. The added pole teeth 134 transform the stator assembly 82 to the assembly 82' of FIG. 14 and the assembly 82' is substituted in the motor 80 for the stator 82.

Figure 14:
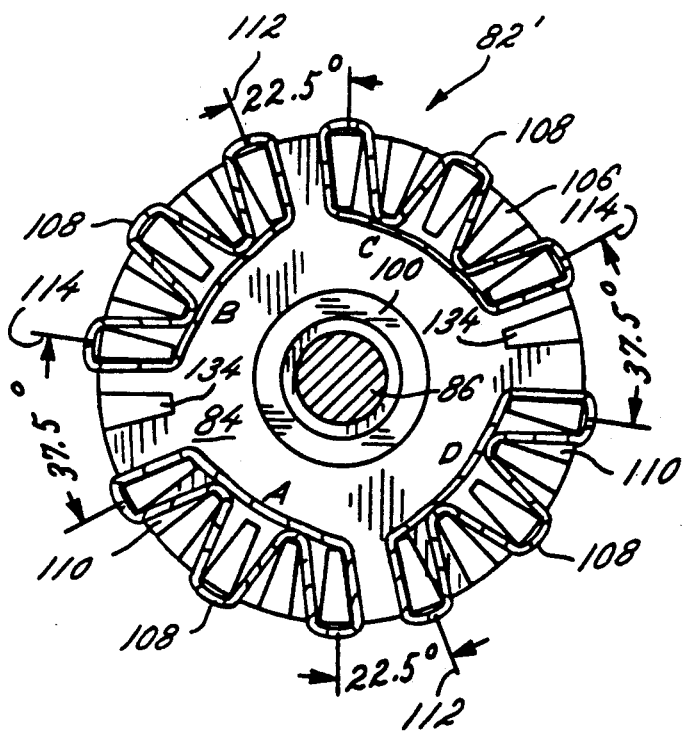
FIG. 14 is a plan view of the stator assembly of FIG. 10 with extra teeth added in two of the circumferential improved stepping accuracy.

In the configuration of the stator assembly 82' in FIG. 14, the two added pole teeth 134 are not enclosed by any of the windings 108A-D. Instead, they each provide a low reluctance path between the stator 82' and the rotor 84 for supporting the flow of flux generated by the two circumferentially adjacent pole teeth of phases B and C when they are energized by their associated windings. Each of these adjacent pole teeth is the end pole tooth of its respective group. As the end pole tooth, it sometimes is associated with a rotor pole that, because of its U-shaped configuration, directs the flux to the gap 114. Without the added teeth 134, the air in the gap provides the only flux path.

As will be explained in connection with FIGS. 15-20, applicants believe the lack of accuracy and stability in the stator 82 of FIG. 10 and how the extra teeth 134 of the stator 82' improve these same characteristics can be understood by analyzing the net torque developed about the rotational axis of the rotor 84 in each of the ideal static positions of the rotor for each stator configurations 82 and 82'. In this connection, FIGS. 15-18 each illustrate the four ideal static positions of the rotor 84 for a complete cycle of energizing the windings 108A-108D. FIGS. 15 and 16 illustrate a first mode of energizing the motor 80 alternatively incorporating the stator 82 (FIGS. 15a-d) and the stator 82' with the extra teeth 134 (FIGS. 16a-d). FIGS. 17a-d and 18a-d illustrate a second mode of energizing the motor 80 alternatively incorporating the stator 82 (FIG. 14a) and the stator 82' (FIG. 15b).

In order to choose a mode of energizing the windings 108A-108D, the controller 128 of FIG. 12 is responsive to a mode selector switch 132 (e.g., a conventional switch). In the first mode, each pair of the windings 108A, C and 108B, D is energized in a predetermined sequence as illustrated in FIGS. 15a-d and 16a-d. This mode of energization was previously described in connection with FIGS. 13a-d and is hereinafter called a single-phase mode of operation. The second mode is called the two-phase mode and is characterized by the simultaneous energization of both pairs of windings 108A, C and 108B, D. The energizing sequence is suggested by the schematic illustration of the serially connected winding pairs 108A, C and 108B, D in FIGS. 17a-d and 18a-d.

Choosing one energizing state as a starting point, the two-phase mode in FIGS. 17a-d and 18a-d calls for energizing current i alternatively flowing in first and second directions through each of the winding pairs 108A, C and 108B, D. The simultaneous energizing of all four windings 108A-108D in the two-phase mode (FIGS. 17 and 18) provides a static torque that is greater by a factor of the square root of two than the static torque developed by the single-phase mode of operation (FIGS. 13a-d, 15 and 16).

In yet another mode of energization, half-step increments of rotation may be implemented by alternating between first and second modes of excitation. For example, series-connected winding pair 108A, C may be energized first, followed by energization of both winding pairs and the only series-connected pair 108B, D. From the foregoing first three steps, the remainder of the sequence will be obvious to those skilled in the art.

As in illustrations of FIGS. 13a-d, FIGS. 15-18 include illustrations of the windings 108A-D in association with arrows indicating which of the series connected pairs of windings 108A, C and 108B, D is energized and in which direction the current is flowing. In both the single-phase and two-phase modes of operation, a complete energization cycle of the winding pairs is made in four steps. Accordingly, each of FIGS. 15 through 18 includes four ideal static positions a-d of the rotor 84 and stator 82, wherein each position corresponds to one of the energization states of the windings 108A-108D.

In the energization and positioning sequence shown for the single phase mode of operation in FIG. 15, the second and third positions of the rotor 84 result in a slight misalignment between several rotor and stator poles. These misalignments cause a torque about the axis of rotation of the rotor 84, thereby skewing or shifting the actual position of the rotor away from the idealized or zero-error position illustrated in the drawings. For example, in the second position illustrated in FIG. 15b, Windings 108B and 108D are energized. Each of the salient poles 140 and 142 of the respective winding pairs 108B and 108D creates a flux path that incorporates an unenergized pole in the adjacent group of poles associated with windings 108A and 108C. Each of these unenergized poles 140 and 142 is not aligned with a pole of the rotor 84, and this misalignment generates a torque that attempts to pull the rotor pole into alignment with the stator pole.

In the four illustrations of FIG. 15a-d, each of the stator and rotor pole pairs that creates such an error torque is identified by a plus (+) or a minus (−).

Whether a (+) or (−) sign is assigned to each of the unaligned poles is determined by whether the torque generated by the flux coupling the poles tends to rotate the rotor toward the right-hand side of the illustration (a "+" rotation) or rotate the rotor toward the left side of the illustration (a "−" rotation). By identifying the sources and direction of the torque in each of the positions, the relative magnitude of the positioning error can be determined.

Figure 15A:
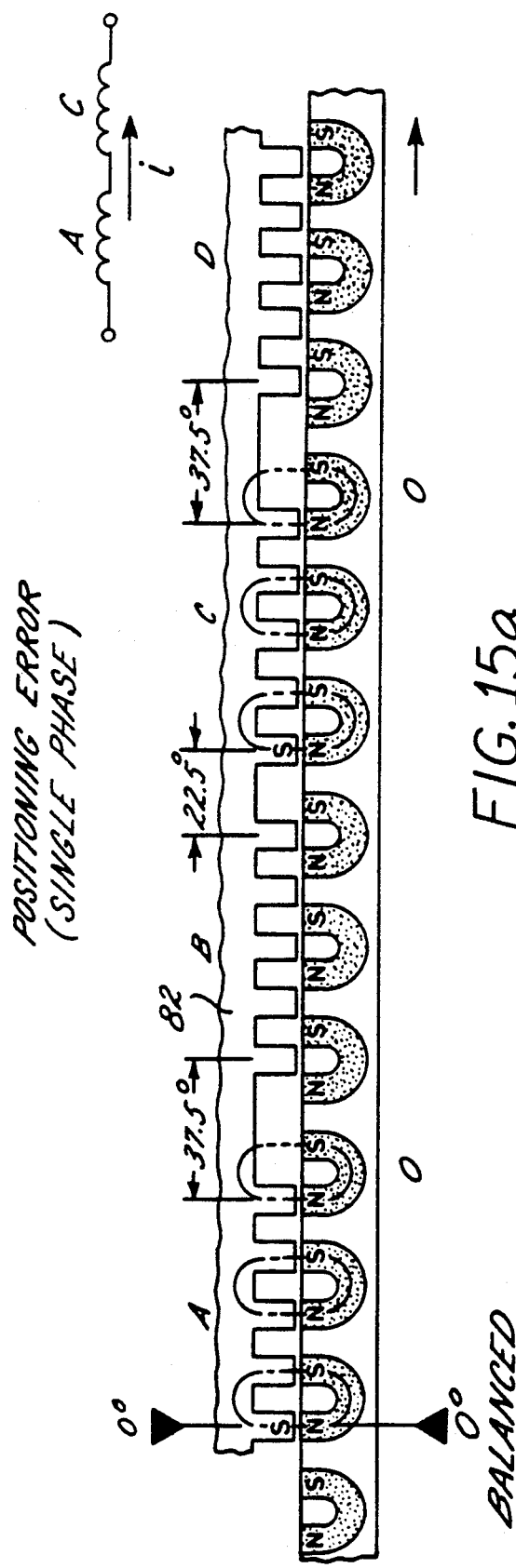
FIGS. 15a-d illustrate the stator and rotor of the motor in FIG. 8 sectioned and unrolled as in FIGS. 14a-d to show the positioning error of the motor in each of the four static positions of a complete energization cycle of the stator windings according to a first mode of energization.
Figure 15B:
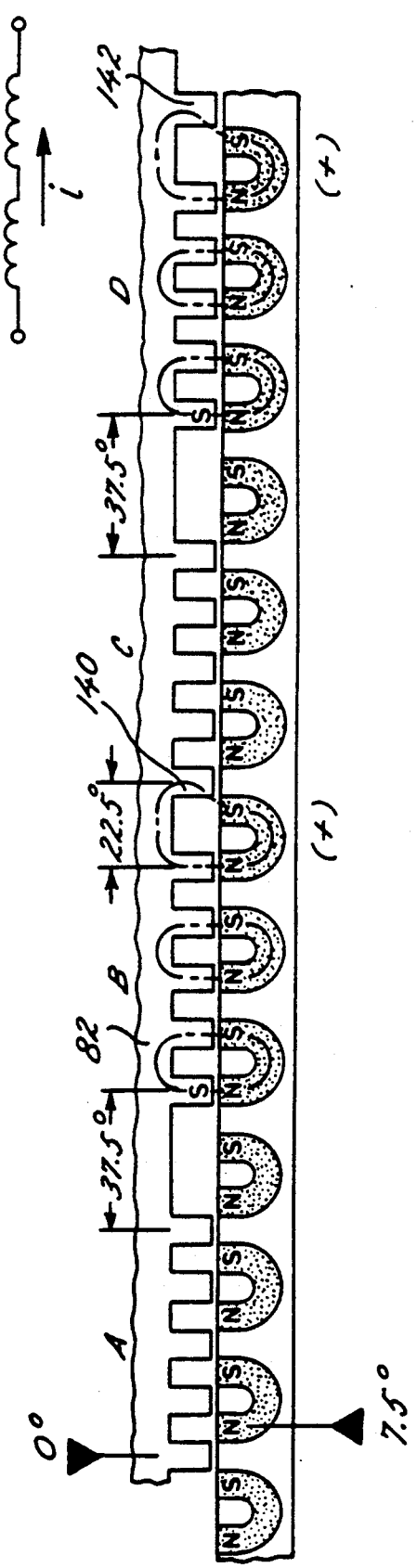

For example, in FIG. 15a where windings 108A and 108C are energized, no unaligned stator and rotor poles support any substantial flux. Therefore, the flux path is substantially "balanced" and the actual positioning of the rotor 84 with respect to the stator 82 should substantially confirm to the idealized position illustrated in the drawings.

In the second position of the rotor 84 shown in FIG. 15b, however, where windings 108B and 108D are energized, the two misaligned stator poles 140 and 142 each create a positive torque with a non-aligned rotor pole. The torques add as indicated by the "+2" in FIG. 15b so that the positioning error is substantial with respect to the idealized position.

Figure 15C:
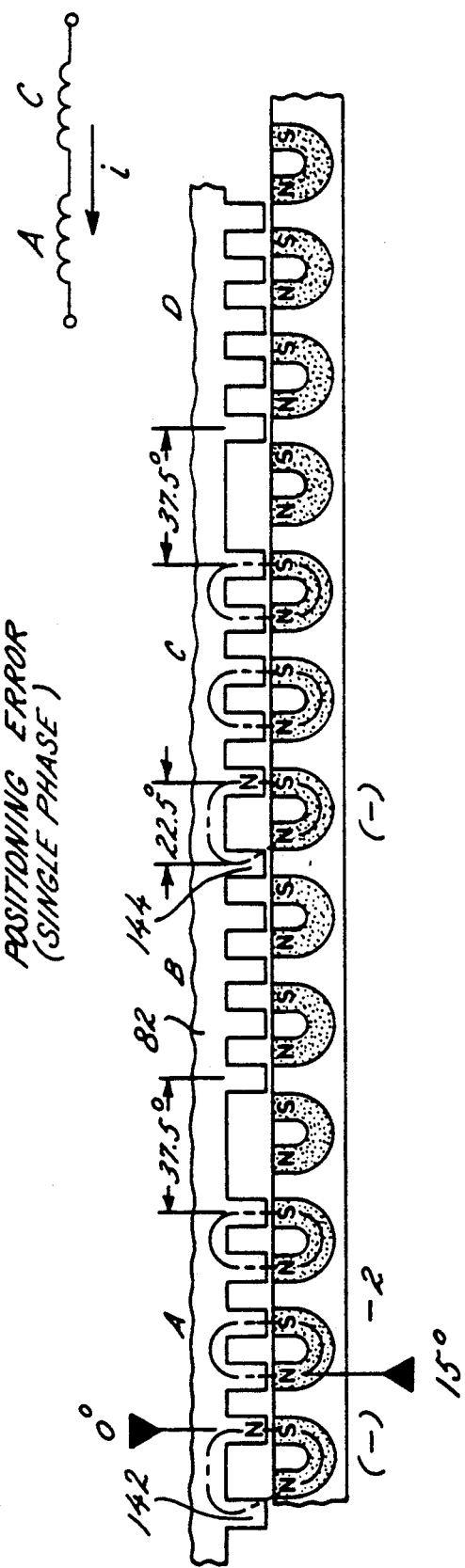

The third position of the rotor 84 in FIG. 15c results from the energization of windings 108A and 108C with a polarity that is reversed with respect to the polarity the same windings were energized with in FIG. 15a. In this third position, stator poles 142 and 144 are coupled to non-aligned poles of the rotor 84 by flux paths that attempt to draw the rotor poles into alignment, thereby generating a torque on the rotor 84. Because both of the torques are in the negative direction, they add together as indicated by the "−2" nomenclature at the side of the illustration.

Figure 15D:
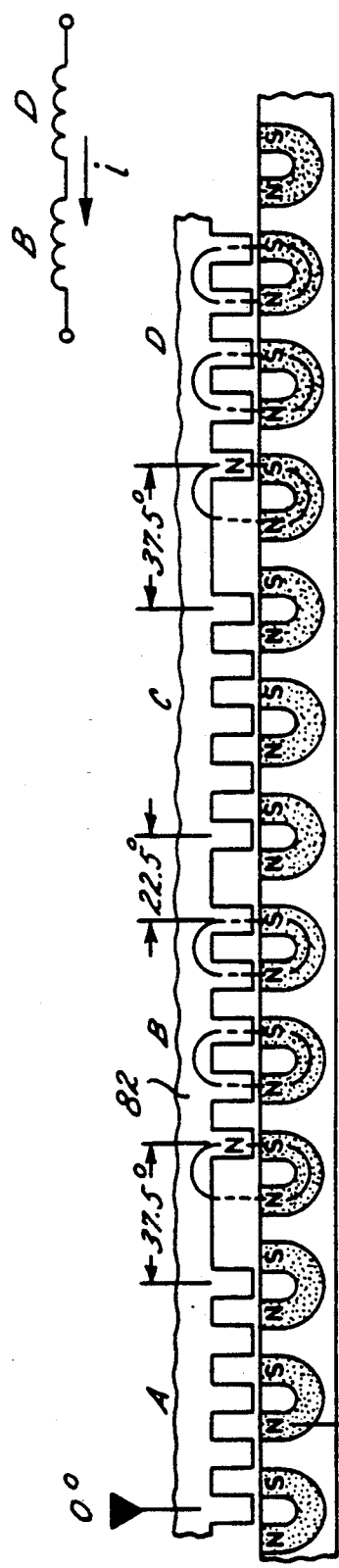
Figure 17C:
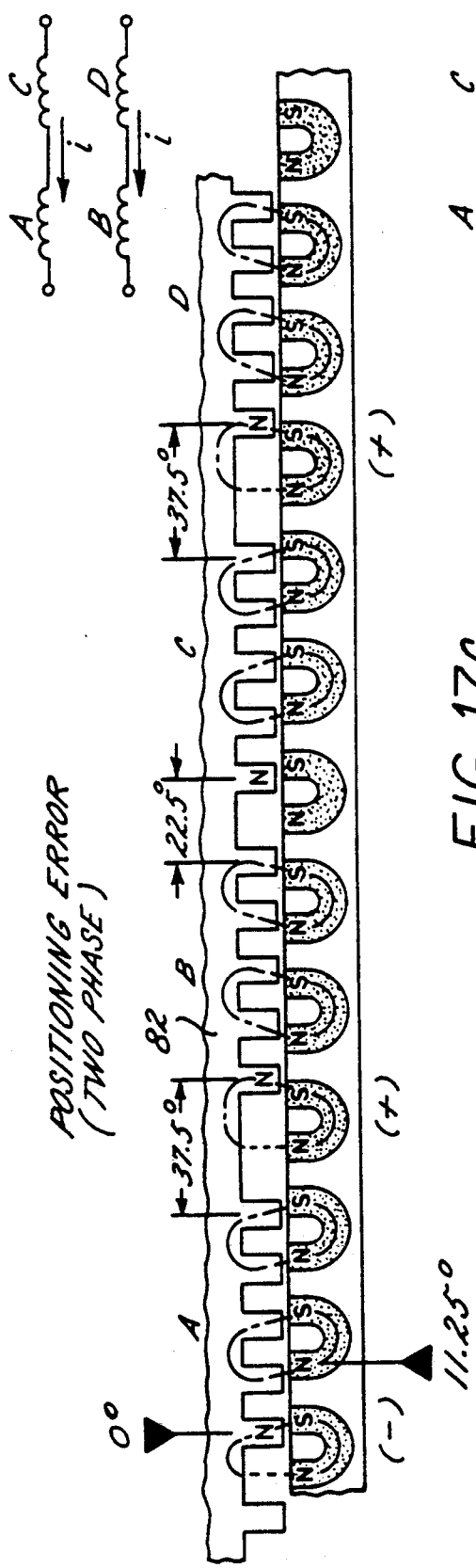
Figure 17D:
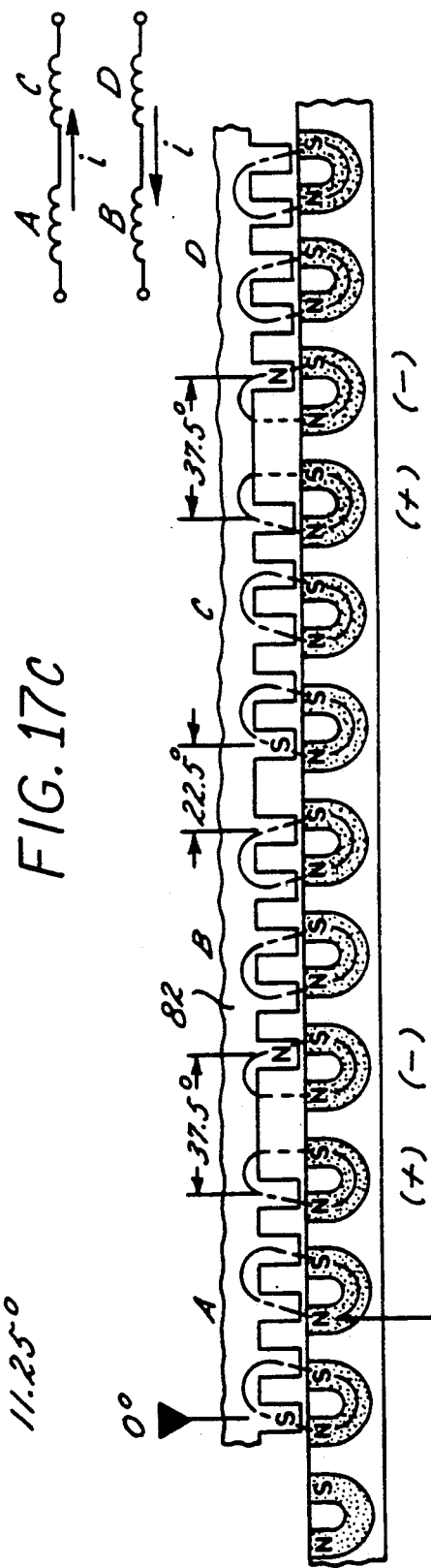

The fourth position of the rotor 84 illustrated in FIG. 15d at the bottom of the drawing results from the energization of windings 108B and 108D with a polarity opposite the energization of the windings in FIG. 15b. In this fourth position, none of the flux lines are coupling unaligned stator and rotor poles. Therefore, no substantial torque is generated in either the negative or positive directions and the idealized position of the rotor 84 illustrated is substantially the actual position of the rotor. Accordingly, the error is considered to be zero and the rotor is "balanced."

In operating the motor of FIGS. 15a-d, the step between the first and second positions of FIGS. 15a and 15b will be relatively longer than the nominal or idealized step (i.e., 7½° in the illustrated configuration), and, therefore, the step includes an error. The +2 torque at the second step of FIG. 15b causes the error by tending to rotate the rotor 84 past its idealized position and slightly toward the third position of FIG. 15c. When the motor is rotated from the second position of FIG. 15b to its third position of FIG. 15c, the step is very short and a different error is intended. The step is short because the positive torque of the second position in FIG. 15b has rotated the rotor toward the third position of FIG. 15c and the negative torque of the third position stops the rotor 84 short of the idealized third position. From the third position of FIG. 15c to the fourth position of FIG. 15d, the step is longer than the nominal step since the rotor 84 starts short of the idealized third position and rotates to the fourth position, which is "balanced." From the fourth position of FIG. 15d back to the first position of FIG. 15a, the step is nominal in length since both the first and fourth idealized static positions have "balanced" torque.

Using the same analysis as applied to the operation of the motor in FIGS. 15a-d, the four illustrations in FIGS. 16a-d show the stator 82' of FIG. 14 generates net error torques of less magnitude in a single-phase mode, thereby reducing the step errors. Specifically, although positive and negative torques are introduced into all of the four positions of FIGS. 16a-d, the positive and negative torques of the second and third positions (FIGS. 16b and 16c) are reduced by 50% with respect to the same positions for the motor of FIGS. 15a-d. As a result of this reduced torque, the step-to-step positioning of the motor incorporating the stator 82' in FIGS. 16a-d is substantially closer to the ideal or nominal step. For example, the step rotation between the first and second positions in FIGS. 16a and 16b, respectively, is the nominal step since both positions have a net "+1" torque. In the second position shown in FIG. 16b, three stator and rotor pole pairs generate torque; however, one of the pairs generates a negative torque that cancels the effect of one of the positive pairs, leaving only one of the positive pairs to create any net effect.

Rotation of the motor of FIGS. 16a-d from the second position (FIG. 16b) to the third position (FIG. 16c) results in a step that is slightly shorter than the nominal or idealized step. In the motor of FIGS. 15a-d, however, the same step is very short since the rotation is between a strong (+2) positive torque and a strong (−2) negative torque, whereas the rotation between the second and third positions shown in FIGS. 16b and 16c, respectively, for the stator 82' is between positive and negative torques of only half the magnitude. Rotation of the motor in FIGS. 16a-d from its third position (FIG. 16c) to its fourth position (FIG. 16d) results in a nominal step with no error since both the third and fourth positions are associated with a negative torque of a magnitude of (−1). Finally, rotation of the rotor 84 from the fourth position (FIG. 16d) to its first position (FIG. 16a) of a new cycle again results in a small error of the same magnitude as the error between the second and third steps.

Again, using the same nomenclature as used in FIGS. 15a-d and 16a-d, the illustrations in FIGS. 17a-d indicate the direction and magnitude of torque error for a motor having the stator 82 of FIG. 10. Therefore, structurally the motor is the same as illustrated in FIGS. 15a-d, except the motor in FIGS. 17a-d is energized in a two-phase mode of operation as indicated by the windings and energization arrows associated with each of the illustrated rotor positions. The positioning error introduced by torque on the rotor 84 from misaligned rotor and stator pole pairs is significantly less than the error introduced by misaligned pole pairs in a single-phase mode of operation of the same motor illustrated in FIGS. 15a-d. In fact, the positioning error of a two-phase mode of operation for the motor with the stator 82 is also less than the error introduced by torque in the motor having the stator 82' when it is energized in a single-phase on mode (FIGS. 16a-d).

The extra tooth 134, however, in the stator 82' in a two-phase mode of operation results in substantially zero torque at each of the static step positions as illustrated in FIGS. 18a-d so that the idealized or zero-error position of each step is approximated by the actual position of the rotor 84 in each step. As a result, the arc of rotation between each step is approximately the nominal step angle. Therefore, the motor having the stator 82' of FIG. 14 when operated in a two-phase mode provides excellent accuracy while maintaining all of the other advantages of the motor structure of the invention.

A plot of the torque errors for motors incorporating each of the stators 82 and 82' and their two modes of operation is illustrated in FIG. 19. The status torque errors have been plotted along a horizontal axis at steps 1-4 and their magnitudes on the vertical axis from "−2" to "+2". In order to provide an indication of the continuous torque error of a rotating motor, the values of the static torque errors have been estimated as illustrated. By estimating the torque values between each step, an approximation of the positioning error waveform in a continuously rotating motor can be made.

Two complete cycles of each of the waveforms created in the plot of FIG. 19 is shown in isolation in one of the FIGS. 20a-20d. The waveforms of 20a and 20c correspond to the dynamic positioning errors for a motor having a stator 82 (FIG. 10) and energized in a single-phase mode and in a two-phase mode, respectively. Correspondingly, FIGS. 20b and 20d illustrate the waveform for the dynamic positioning error of a motor incorporating a stator 82' (FIG. 14) and energized in a single-phase mode and a two-phase mode, respectively. As the waveform of FIG. 20a illustrates, the error frequency for the stator 82 of FIG. 10 when energized in a single-phase mode is discontinuous and, therefore, provides an erratic and difficult to control error factor. A single-phase mode of operation for the stator 82' of FIG. 14 provides a slightly larger amplitude but continuous and periodic error waveform as shown in FIG. 20b. Because the error is continuous and periodic, the one-phase mode of operation of the motor with the stator 82' is smoother than the one-phase mode of operation of the motor with the stator 82, with its discontinuous error. For a two-phase mode of operation of the motor with the stator 82, the waveform of the positional error in FIG. 20c is continuous and periodic. Finally, the two-phase mode of operation of a motor incorporating the stator 82' of FIG. 14 provides zero error both statically and dynamically as indicated by the straight line of FIG. 20d.

Referring to FIG. 21, a pair of torque output curves 140 and 142 of the motor 80 are shown. The curves 140 and 142 were generated utilizing a motor 80 having a rotor diameter of 2.375 inches, with the curve 140 produced by a drive of three (3) amps per motor phase and the curve 142 produced by a drive of two (2) amps per motor phase. As can be see, both output curves 140 and 142 provide a relatively high stable output torque from zero steps per second to on the order of 1800 steps per second. The graph of FIG. 21 was extended to 1800 steps per second as illustrated by the dashed lines between 500 and 600 on the graph illustrated by curve 144. As can be seen by the curves 140 and 142, the motor 80 produced a unusually flat dynamic torque curve over a wide range of speeds.

In contrast, a prior art 2.75 inch diameter motor started with a high initial torque, but quickly fell off to essentially zero torque by a speed of about 200 steps per second. The prior art motor was a North American Phillips model L82702-2 motor.

From the foregoing, it can be appreciated that a simple and versatile motor construction 80 is disclosed which can be operated in at least three alternative modes of energization such that reasonable stepping accuracy and stability can be achieved in any of the modes. Furthermore, the motor 80 is relatively inexpensive to manufacture and has relatively few and simple parts, thereby enabling easy miniaturization.

We claim:

1. An axial pole stepping motor comprising, in combination:
   a disc having a plurality of permanent magnet segments comprising alternate north-south poles equidistantly and circumferentially spaced on the disc wherein the disc is a unitary ceramic member with magnetized areas forming the permanent magnet segments, which are horseshoe shaped having the north-south poles adjacent one another on one side of the disc;
   stator means aligned on a common axis with the disc, the stator means comprising at least one salient pole stator having a yoke with a plurality of teeth defining the salient poles, the teeth extending from the yoke in a direction parallel to the axis and directed toward the permanent magnet segments of the disc, the teeth being arranged into at least two groups and evenly spaced within each of the groups defining gaps between the teeth, the groups being angularly offset from each other thereby defining a stepping angle; and
   at least two continuous skein winding means placed in the gaps between the teeth and fitted around the teeth in labyrinth pattern so that energization of the skein winding means magnetizes the teeth with alternate north-south poles.

2. The axial pole stepping motor of claim 1 further comprising means for alternately energizing the skein winding means to sequentially alter the magnetic polarity of the teeth within the respective groups thereby causing poles of opposite polarity on the disc to line up with the teeth of the stack means so as to cause the stepping motor to step.

3. The axial pole stepping motor of claim 1 wherein the stator means includes two stators positioned along the axis on opposite sides of the disc, the teeth of the yokes projecting inwardly toward the permanent magnet segments of the disc, the stators being offset from each other by the stepping angle.

4. The axial pole stepping motor of claim 3 wherein the teeth of one stator are positioned opposite the gaps of the other stator thereby substantially balancing the magnetic flux paths produced by energizing the skein winding means.

5. The axial pole stepping motor of claim 2 wherein only one of the skein winding means is energized at any given time.

6. The axial pole stepping motor of claim 3 wherein the number of the permanent magnet segments on the disc is equal to the number of the teeth on each of the stators.

7. The axial pole stepping motor of claim 1 wherein the salient pole stator is a unitary member made of a high permeability powder metal, the stator is formed by a yoke having a plurality of evenly spaced salient poles extending axially therefrom, the skein winding means is bent around the salient poles to substantially follow a contour of the salient poles in a labyrinth pattern.

8. The axial pole stepping machine of claim 1 wherein the stator means includes one stator positioned adjacent one side of the disc.

9. The axial pole stepping machine of claim 8 wherein said stator assembly includes at least one tooth positioned between said at least two groups and not associated with said skein winding means, said tooth aiding in the stability and accuracy of said stepping angle.

10. A one-sided axial pole stepping motor comprising, in combination:

a drive shaft mounted for rotation about its longitudinal axis;

a rotor secured to said shaft, having a disc-like shape with first and second sides and a plurality of permanent magnet segments including alternate north-south poles equidistantly and circumferentially spaced on said rotor;

a stator assembly aligned on said shaft with said rotor and positioned on one side of said rotor, said stator assembly comprising a yoke surrounding said shaft and having a plurality of teeth extending from said yoke in a direction parallel to the axis and toward said permanent magnet segments of said rotor, said teeth being arranged into at least two groups and evenly spaced within each of said two groups such hat the teeth of each group may be axially aligned with said north-south poles of said rotor, said at least two groups being circumferentially offset from each other such that said teeth of said at least two groups cannot be simultaneously aligned with said north-south poles of said rotor, said offset defining a stepping angle for the rotation of said shaft and rotor;

at least two continuous skein winding each woven in a labyrinth pattern between and around said teeth of one of said at least two groups so that energization of said skein windings magnetizes said teeth with alternate north-south salient poles; and a generally cylindrical housing having one end closed and a second end open for engagement with a flange circumscribing said yoke such that said yoke closes said second end and serves as a second end wall for said housing, thereby fully enclosing said rotor, said at least two skein windings and said teeth.

11. The axial pole stepping motor of claim 10 wherein said stator assembly includes at least one tooth positioned between said at least two groups and not associated with said skein windings, said tooth aiding in the stability and accuracy of said stepping angle.

12. The axial pole stepping motor of claim 10 wherein said at least two groups include first, second, third and fourth groups wherein said teeth of said first and third groups may be simultaneously aligned with the north-south poles of said rotor and said teeth of said second and fourth groups may be simultaneously aligned with said north-south poles of said rotor, and said at least two continuous skein windings comprise first, second, third and fourth skein windings, each associated with one of said first, second, third and fourth groups, and means for simultaneously energizing the skein windings of said first and third groups and subsequently energizing the skein windings of said second and fourth groups in order to rotate said shaft and said rotor in incremental steps about said longitudinal axis.

13. The axial pole stepping motor of claim 10 wherein means are provided for simultaneously energizing said at least two skein windings of said at least two groups such that the currents in said windings are reversed in a predetermined sequence in order to rotate said shaft and said rotor in incremental steps about said longitudinal axis.

14. An axial pole stepping motor comprising, in combination:

a shaft for rotation about its longitudinal axis;

a disc having a plurality of permanent magnet segments comprising alternate north-south poles equidistantly and circumferentially spaced on said disc;

a stator assembly including a yoke surrounding said shaft and spaced along the length of said shaft from said disc;

a plurality of teeth distributed circumferentially about a periphery of said yoke, said teeth extending axially toward said disc, said plurality of teeth being divided into at least first and second groups, said first and second groups each including teeth that are circumferentially and evenly spaced about a portion of said periphery and offset from each other such that said teeth of only one of said first or second groups may be simultaneously aligned along said longitudinal axis with the alternate north-south poles of said disc;

a continuous skein winding placed in between the teeth of each of said first and second groups and fitted around said teeth in a labyrinth pattern so that energization of the skein winding magnetizes the teeth with alternate north-south poles; and a generally cylindrical housing having one end closed and a second end opened for engagement with a flange circumscribing said yoke such that said yoke closes said second end and serves as a second end wall for said housing, thereby fully enclosing said disc, said first and second groups of teeth and their associated skein windings.

15. The axial pole stepping motor of claim 14 wherein said at least two groups comprise first, second, third and fourth groups such that said teeth of said first and third groups may be simultaneously aligned with the north-south poles of said disc and said teeth of said second and fourth groups may be simultaneously aligned with said north-south poles of said disc;

a continuous skein winding placed in between the teeth of each of said first, second, third and fourth groups; and means for simultaneously energizing the skein windings of said first and third groups and subsequently energizing the skein windings of said second and fourth groups in order to rotate said shaft and disc in incremental steps about said longitudinal axis.

16. The axial pole stepping motor of claim 14 wherein means are provided for simultaneously energizing the skein windings of said at least two groups such that the currents in said windings are reversed in a predetermined sequence in order to rotate such shaft about said disc in incremental steps about said longitudinal axis.

17. The axial pole stepping motor of claim 16 wherein such stator assembly includes means positioned between said at least two group of said teeth for aiding in the stability and accuracy of said incremental steps.

18. The axial pole stepping motor of claim 17 wherein said means positioned between said at least two groups of said teeth include at least one tooth extending axially from said yoke.

19. An axial pole stepping motor comprising, in combination:

a shaft for rotation about its longitudinal axis;

a disc having a plurality of permanent magnet segments comprising alternate north-south poles equidistantly and circumferentially spaced on said disc, wherein the magnet segments formed in the disc are substantially horseshoe shaped, having the north-south poles adjacent one another on one side of the disc, such that the flux paths in the rotor enter and leave from the same one side;

a stator assembly including a yoke surrounding said shaft and spaced along the length of said shaft from said disc;

a plurality of teeth distributed circumferentially about a periphery of said yoke, said teeth extending axially toward said disc, said plurality of teeth being divided into at least first and second groups, said first and second groups each including teeth that are circumferentially and evenly spaced about a portion of said periphery and offset from each other such that said teeth of only one of said first or second groups may be simultaneously aligned along said longitudinal axis with the alternate north-south poles of said disc; and a continuous skein winding placed in between the teeth of each of said first and second groups and fitted around said teeth in a labyrinth pattern so that energization of the skein winding magnetizes the teeth with alternate north-south poles.

20. An axial pole stepping motor comprising, in combination:

a shaft for rotation about its longitudinal axis;

a rotor secured to said shaft, having a disc-like shape with first and second sides and a plurality of permanent magnet segments including alternate north-south poles equidistantly and circumferentially spaced on said rotor:

a stator assembly aligned on said shaft with said rotor and positioned on one said of said rotor, said stator assembly comprising a yoke surrounding said shaft and having a plurality of teeth extending from said yoke in a direction parallel to the axis and toward said permanent magnet segments of said rotor, said teeth being arranged into at least two groups and evenly spaced within each of said two groups such that the teeth of each group may be axially aligned with said north-south poles of said rotor, said at least two groups being circumferentially offset from each other such that said teeth of said at least two groups cannot be simultaneously aligned with the north-south poles of said rotor, said offset defining a stepping angle for the rotation of such shaft and rotor;

windings associated with each of said at least two groups for forming alternate north-south salient poles from said teeth;

means for energizing said windings in at least two alternative modes wherein the static torque developed by said motor in one mode is greater than the static torque developed in the other mode; and a generally cylindrical housing having one end closed and a second end open for engagement with a flange circumscribing said yoke such that said yoke closes said second end and serves as a second end wall for said housing, thereby fully enclosing said rotor, said windings and said teeth.

21. The axial pole stepping motor of claim 20 wherein said stator assembly includes at least one tooth positioned between said at least two groups and not associated with a winding, said tooth aiding in the stability and accuracy of said stepping angle during operations of said motor by said means in the mode providing the maximum static torque.

22. The axial pole stepping motor of claim 20 wherein said means for energizing said windings in two alternative modes includes means for simultaneously energizing all of said windings and sequentially reversing the direction of currents in the simultaneously energized windings in order to initiate a rotating electromagnetic field.

23. A one-sided axial pole stepping motor comprising, in combination:

a drive shaft mounted for rotation about its longitudinal axis;

rotor secured to said shaft, having a disc-like shape with first and second sides and a plurality of permanent magnet segments including alternate north-south poles equidistantly and circumferentially spaced on said rotor wherein the magnetic segments formed in the rotor are substantially horseshoe shaped, having the north-south poles adjacent one another on one side of the rotor, such that the flux paths in the rotor enter and leave from the same one side;

a stator assembly aligned on said shaft with said rotor and positioned on one side of said rotor, said stator assembly comprising a yoke surrounding said shaft and having a plurality of teeth extending from said yoke in a direction parallel to the axis and toward said permanent magnet segments of said rotor, said teeth being arranged into at least two groups and evenly spaced within each of said two groups such hat the teeth of each group may be axially aligned with said north-south poles of said rotor, said at least two groups being circumferentially offset from each other such that said teeth of said at least two groups cannot be simultaneously aligned with said north-south poles of said rotor, said offset defining a stepping angle for the rotation of said shaft and rotor; and at least two continuous skein winding each woven in a labyrinth pattern between and around said teeth of one of said at least two groups so that energization of said skein windings magnetizes said teeth with alternate north-south salient poles.

24. An axial pole stepping motor comprising, in combination:

a shaft for rotation about its longitudinal axis;

a rotor secured to said shaft, having a disc-like shape with first and second sides and a plurality of permanent magnet segments including alternate north-south poles equidistantly and circumferentially spaced on said rotor, wherein said magnet segments formed in the rotor are substantially horseshoe shaped, having the north-south poles adjacent one another on one side of the rotor, such that the flux paths in the rotor enter and leave from the same one side;

a stator assembly aligned on said shaft with said rotor and positioned on one side of said rotor, said stator assembly comprising a yoke surrounding said shaft and having a plurality of teeth extending from said yoke in a direction parallel to the axis and toward said permanent magnet segments of said rotor, said teeth being arranged into at least two groups and evenly spaced within each of said two groups such hat the teeth of each group may be axially aligned with said north-south poles of said rotor, said at least two groups being circumferentially offset from each other such that said teeth of said at least two groups cannot be simultaneously aligned with said north-south poles of said rotor, said offset defining a stepping angle for the rotation of said shaft and rotor;

windings associated with each of said at least two groups for forming alternate north-south salient poles from said teeth; and means for energizing said windings in at least two alternate modes wherein the static torque developed by said motor in one mode is greater than the static torque developed in the other mode.

* * * * *

UNITED STATES PATENT AND TRADEMARK OFFICE
CERTIFICATE OF CORRECTION

PATENT NO. : 5,168,187
DATED : December 1, 1992
INVENTOR(S) : Baer et al.

It is certified that error appears in the above-indentified patent and that said Letters Patent is hereby corrected as shown below:

Column 8, line 4, delete "3" and substitute therefor -- 32 --;

Column 8, line 56, delete "fort" and substitute therefor -- forth --;

Column 11, line 13, delete "Il" and substitute therefor -- 11 --;

Column 12, line 36, delete "108" and substitute therefor -- 108A --;

Column 12, line 40, delete "D" and substitute therefor -- C --;

Column 21, line 31, delete "said" and substitute therefor -- side --;

Column 22, line 27, delete "hat" and substitute therefor -- that --; and

Column 22, line 61, delete "hat" and substitute therefor -- that --.

Signed and Sealed this

Tenth Day of May, 1994

BRUCE LEHMAN

*Attest:*

*Attesting Officer*  *Commissioner of Patents and Trademarks*